United States Patent [19]
Fujisaki et al.

[11] Patent Number: 5,392,363
[45] Date of Patent: Feb. 21, 1995

[54] ON-LINE CONNECTED HANDWRITTEN WORD RECOGNITION BY A PROBABILISTIC METHOD

[75] Inventors: Tetsunosuke Fujisaki, Armonk; Krishna S. Nathan, New York, both of N.Y.

[73] Assignee: International Business Machines Corporation, Armonk, N.Y.

[21] Appl. No.: 975,864

[22] Filed: Nov. 13, 1992

[51] Int. Cl.⁶ ............................................. G06K 9/00
[52] U.S. Cl. ...................................... 382/13; 382/37; 382/39; 382/21
[58] Field of Search ................... 382/13, 21, 37, 38, 382/39, 40, 25

[56] References Cited

U.S. PATENT DOCUMENTS

| | | | |
|---|---|---|---|
| 3,111,646 | 11/1963 | Harmon | 340/146.3 |
| 4,731,857 | 3/1988 | Tappert | 382/9 |
| 4,764,972 | 8/1988 | Yoshida | 382/13 |
| 5,029,223 | 7/1991 | Fujisaki | 382/24 |
| 5,058,144 | 10/1991 | Fiala et al. | 375/122 |
| 5,067,166 | 11/1991 | Ito | 382/37 |
| 5,151,950 | 9/1992 | Hullender | 382/37 |
| 5,151,951 | 9/1992 | Ueda et al. | 382/16 |

OTHER PUBLICATIONS

C. C. Tappert, "Adaptive On-line Handwriting Recognition", IEEE Seventh Int'l Conference on Pattern Recognition Proceedings, Jul. 30–Aug. 2, 1984, Montreal, Canada pp. 1004–1007.

Kurtzberg et al., "Handwriting Recognition By Substroke Segmentation and Composition", IBM Tech. Disc. Bulletin, vol. 27, No. 9, Feb. 1985, pp. 5167–5170.

Fujisaki et al., "Online Recognizer For Runon Handprinted Characters", Proceedings of the Tenth Int'l Conference on Pattern Recognition, Atlantic City, N.J., Jun. 16–21, 1990, pp. 450–454.

*Primary Examiner*—Joseph Mancuso
*Assistant Examiner*—Jon Chang
*Attorney, Agent, or Firm*—Perman & Green

[57] ABSTRACT

Methods and apparatus are disclosed for recognizing handwritten words in response to an input signal from a handwriting transducer. The method includes the steps of: (a) partitioning the input signal into N frames; and (b) processing words from a vocabulary model to determine, for each processed word, a probability that the word represents a written word that is conveyed by the input signal. The determined probability is a function of N letter-frame alignment probabilities and also a probability based on a grouping of the N frames into L groups, where L is a number of letters in the word. A further step (c) identifies a word having a highest determined probability as being a most-likely word that is conveyed by the input signal. The determined probability is also a function of (a) a probability based on a frequency of occurrence of words and portions of words within a selected language model; and (b) when processing a frame other than the Nth frame, a number of frames that remain to be processed. In one embodiment of the invention all words in the vocabulary model are searched in parallel, thereby significantly reducing the recognition time. The use of a beam search technique is illustrated to perform the parallel search. Also, this invention teaches the use of hashing to increase the speed of the beam search technique.

36 Claims, 21 Drawing Sheets

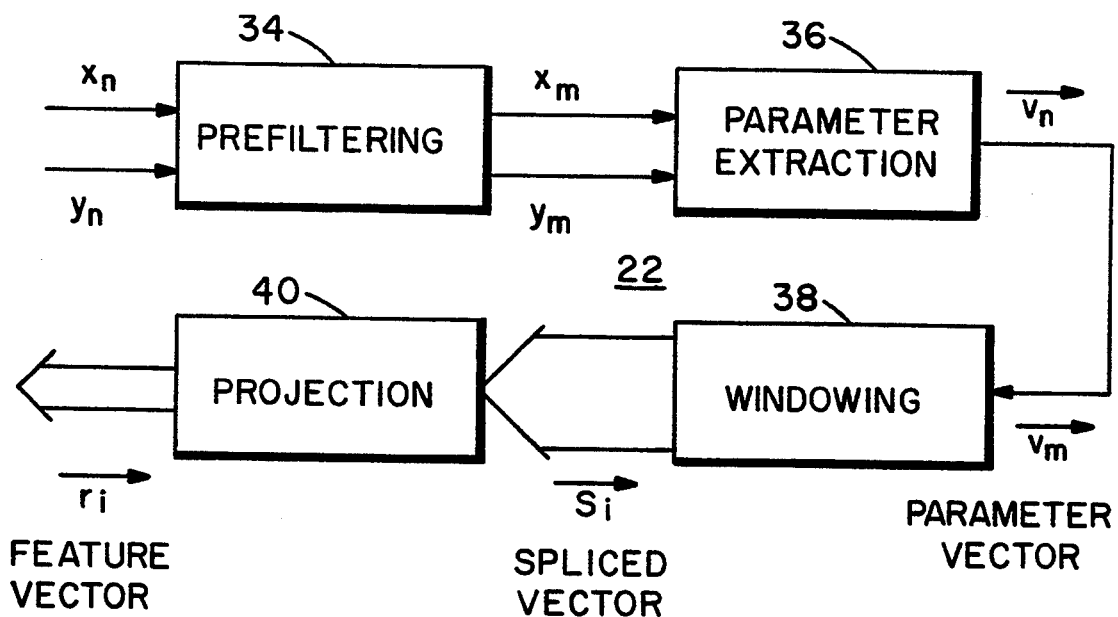
FIG. 4
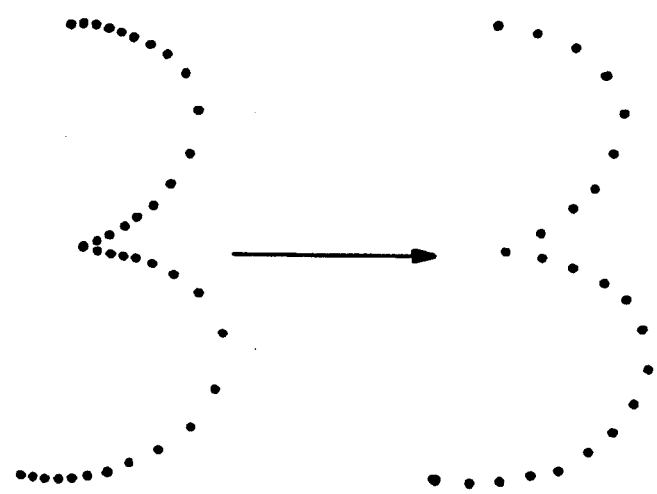
BALLISTICALLY SPACED
FIG. 5
EQUALLY SPACED
FIG. 6

TRIE

FIG. 12

LOCAL FEATURES
- $\Delta x_m = x_m - x_{m-1}$
- $\Delta y_m = y_m - y_{m-1}$
- $\cos \Theta_m = (x_{m+1} - x_{m-1}) / \sqrt{(x_{m+1} - x_m)^2 + (y_{m+1} - y_m)^2}$
- $\sin \Theta_m = (y_{m+1} - y_{m-1}) / \sqrt{(x_{m+1} - x_m)^2 + (y_{m+1} - y_m)^2}$ } ESTIMATE OF SLOPE AT CURRENT POSITION
- $\cos \Theta_{m+1} - \cos \Theta_{m-1}$
- $\sin \Theta_{m+1} - \sin \Theta_{m-1}$ } ESTIMATE OF CURVATURE AT CURRENT POSITION

FIG. 14

GLOBAL FEATURES
- $y_m$
- $x_m - x_i$
- $\text{gap dist} = \sqrt{(x_k - x_j)^2 + (y_k - y_j)^2}$  INTERSTROKE DISTANCE

ON-LINE CONNECTED HANDWRITTEN WORD RECOGNITION BY A PROBABILISTIC METHOD

FIELD OF THE INVENTION

This invention relates generally to handwriting recognition systems and, in particular, relates to methods and apparatus for recognizing handwritten cursive writing.

BACKGROUND OF THE INVENTION

Symbols formed by handwriting, when traced on an electronic tablet, are represented by sequences of x-y coordinate pairs. A fundamental unit of handwriting is the stroke. A stroke is considered as a sequence of points, represented by their respective x-y coordinates. Symbols, such as letters of the alphabet and numbers, are assemblages of such strokes.

Automatic systems purporting to recognize cursive script writing, or even handwritten characters, have so far met with only limited success.

For example, reference is made to U.S. Pat. No. 4,731,857 which describes a three-step procedure for the recognition of run-on handwritten characters. First, potential segmentation points are derived. Second, all combination of the segments that could reasonably be a character are sent to a character recognizer to obtain ranked choices and corresponding scores. Third, the character sequences are combined so that the best candidate word wins. The recognition algorithm is based upon a template matching technique. Each template is a fully formed character that is assumed to be representative of the writer's average manner of forming the character. An elastic matching technique is employed to determine a score of a current character relative to each template. However, this strategy is vulnerable to the extensive variability that can be observed across different writers, and the variability of a single writer at different points in time.

Reference is also made to commonly assigned U.S. Pat. No. 5,029,223 by T. Fujisaki. This patent teaches the use of a beam search technique, in conjunction with a stack that represents a search space. Stroke labels and associated scores are represented within the search space, and the beam search technique identifies a most probable stroke label as representing an input handwritten character. One or more constraint validation filters can be employed to validate paths through the search space, and to remove invalid paths.

It is an object of this invention to provide an accurate, rapid method and apparatus for recognizing words written in a cursive manner.

It is another object of this invention to provide a dynamic programming method and apparatus for recognizing words represented by cursive handwriting.

A further object of this invention is to provide a method and apparatus that operates in a parallel manner to process cursive handwriting and to compare the cursive handwriting to a vocabulary to identify a most probable word that is represented by the cursive handwriting.

Another object of this invention provides a method and apparatus that employs conditional probabilities and, operating in a parallel manner, processes cursive handwriting in cooperation with a vocabulary to identify a most probable word that is represented by the cursive handwriting.

A further object of this invention is to provide a method and apparatus that provides a beam search technique, in conjunction with hashing, to process in a rapid, parallel manner a cursive handwriting input so as to identify a most probable word that is represented by the handwriting input.

SUMMARY OF THE INVENTION

The foregoing and other problems are overcome and the objects of the invention are realized by methods and apparatus that accomplish an automatic recognition of cursive handwritings, wherein individual letters of a word are connected to one another.

In a presently preferred embodiment of the invention a signal processing front-end of the handwriting recognition system transforms the handwriting input onto a higher dimensional feature space (chirographic space), having points that represent all raw observations after non-redundant feature extraction.

The recognition method employs dynamic programming techniques, with or without parallization, and operates with conditional probabilities to identify a stream of pre-processed handwriting data as a recognized word.

An embodiment of the recognition method prepares models for each letter and performs recognition based on the letter models by the following recognition steps:
1. choose one word from a vocabulary at a time;
2. for the chosen word, find a most-likely letter alignment and a likelihood score of the input signal against the chosen word;
3. repeat steps 1 and 2 for all words in the vocabulary; and
4. for a letter alignment that gives the best likelihood score, the associated word is the most-likely word for the input.

A further embodiment of the recognition method eliminates the outer loop that is implicit in step (3). Instead, all words in the vocabulary are searched in parallel. With this presently preferred method, the search for the most-likely letter alignment is performed for all words in the vocabulary in parallel, thereby significantly reducing the recognition time. The use of a beam search technique is illustrated to perform the parallel search. Also, this invention teaches the use of hashing to increase the speed of the beam search technique.

In accordance with this invention there is disclosed a method for recognizing handwritten words in response to an input signal from a handwriting transducer. The method includes the steps of: (a) partitioning the input signal into N frames; and (b) processing words from a vocabulary model to determine, for each processed word, a probability that the word represents a written word that is conveyed by the input signal. The determined probability is a function of N letter-frame alignment probabilities and also a probability based on a grouping of the N frames into L groups, where L is a number of letters in the word. A further step (c) identifies a word having a highest determined probability as being a most-likely word that is conveyed by the input signal.

The determined probability is also a function of (a) a probability based on a frequency of occurrence of words and portions of words within a selected language model; and (b) when processing a frame other than the Nth frame, a number of frames that remain to be processed.

BRIEF DESCRIPTION OF THE DRAWINGS

The above set forth and other features of the invention are made more apparent in the ensuing Detailed Description of the Invention, when read in conjunction with the attached Drawings, wherein:

FIG. 4 is a detailed block diagram of the front-end parameter extraction block which is shown generally in FIG. 3;

FIG. 5 illustrates a ballistically spaced character which in input to the pre-filtering blocks of FIG. 4;

FIG. 6 illustrates an equally spaced character which is output from the pre-filtering block of FIG. 4;

FIG. 12 illustrates a six dimensional local parameter vector generated for the point (P) of FIG. 11 by collecting a plurality of local spatial attributes;

FIG. 14 illustrates a three dimensional global parameter vector generated for the point (P) of FIG. 13 by collecting a plurality of global spatial attributes;

DETAILED DESCRIPTION OF THE INVENTION

Figure 1:
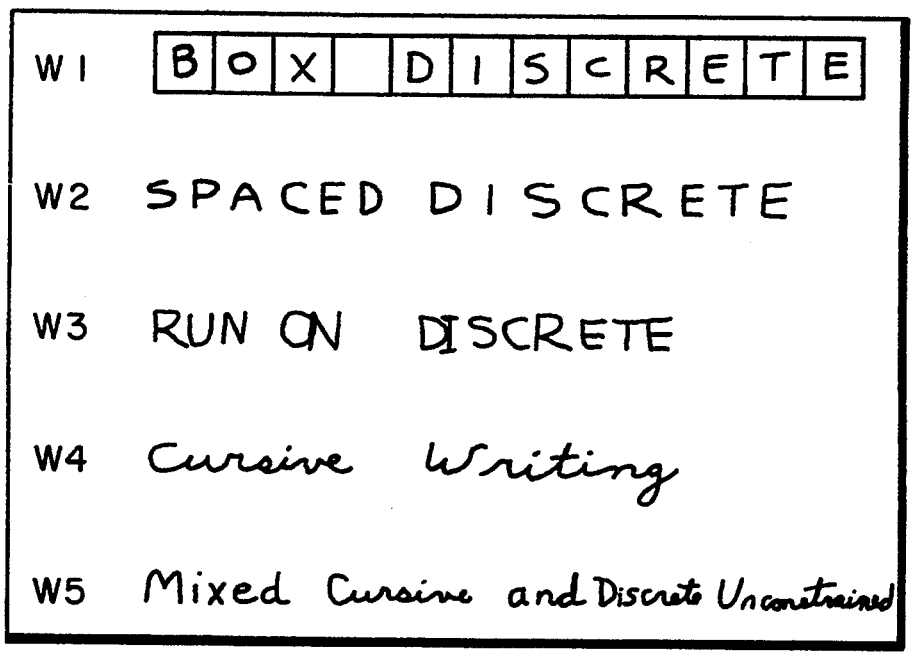
FIG. 1 provides examples of five different types of handwriting.

The recognition method of this invention operates with connected writings, and assumes that writers write words separately on base lines. One possible, although not generally satisfactory approach for solving this problem is outlined below.

This approach prepares models (templates) for each word. In this strategy, the input, corresponding to a word, is compared to word models as a whole. This strategy is relatively simple, and does not require that sub-parts of the input signal be aligned to letters. However, word models must be prepared for every word to be recognized. Furthermore, for many applications the number of words that are desired to be recognized is large and, as a result, this approach may prove impractical. Also, in that a word model is long in terms of time duration, numerous variations of word models should be collected to accommodate various styles of writing. Thus, this strategy is not realistic for a large vocabulary task.

Another, presently preferred, technique prepares models for each letter and performs recognition based on the letter models. This strategy however, is more complicated than the previous strategy because the unit of input is different from the unit of models in a data base. This technique employs the following recognition steps:

1. choose one word Wi from a vocabulary at a time;
2. for the word Wi, find a most-likely letter alignment Ai and its likelihood score of the input signal against the chosen word Wi;
3. repeat steps 1 and 2 for all words in the vocabulary; and
4. if Aj gives the best likelihood score, Wj is the most-likely word for identifying the input signal.

The present invention employs a dynamic programming technique to accomplish step (2) of the above-described recognition method.

If step (2) requires T milli-seconds, and if the size of the vocabulary is N, the total recognition time becomes T×N milli-seconds. However, this recognition time may be unacceptable for a large vocabulary.

The present invention therefore also teaches a recognition method that does not require the outerloop that is implicit in step (3). Instead, all words in the vocabulary are searched in parallel. With this presently preferred method, the search for the most-likely letter alignment is performed for all words in the vocabulary in parallel, thereby significantly reducing the recognition time.

The teaching of the present invention assumes that the input data that is generated in response to a handwriting transducer is partitioned into equi-length windows or frames, which may or may not overlap one another. Before describing in detail the recognition method and apparatus of this invention, a description is first made of the operation of the handwriting recognition system in inputting handwriting data, representing the handwriting in one or several feature vector spaces, performing Euclidean and Gaussian modelling in each space, and performing mixture decoding to take into account the contribution of all relevant prototypes in all spaces.

That is, a presently preferred embodiment of this invention employs a technique disclosed in commonly assigned U.S. patent application Ser. No. 07/785,642, filed Oct. 10, 1991, entitled "A Statistical Mixture Approach to Automatic Handwriting Recognition" by J Bellagarda, E Bellagarda, D. Nahamoo and K. Nathan, to pre-process the handwriting input. The present invention extends this teaching by the use of a plurality of conditional probabilities and by the use of parallel search techniques, such as a beam search, to perform word recognition. The present invention also teaches the use of hashing to gain significant reductions in search times.

Before describing the teaching of this invention in further detail, a description is first made of the presently preferred embodiment for inputting, partitioning, and pre-processing the handwriting data.

In handwriting recognition, handwritten characters generally fall into five groups depicted in FIG. 1, the groups being depicted in increasing order of recognition complexity. Specifically, these groups include a first type of writing (W1) known as box discrete wherein individual characters are formed Within predefined areas, or boxes, thereby simplifying the task of character segmentation. A second type of writing (W2) is known as spaced discrete wherein the user intentionally forms each character such that no character touches another. A third type of writing (W3) is known as run-on discrete wherein the user may form characters that touch or "run-on" to, one another. A fourth type of writing (W4) is cursive writing where the user normally writes the whole word as a series of connected letters, and then subsequently crosses the t's and dots the i's and j's. Finally, a fifth type of writing (W5) is unconstrained writing wherein the user may use a mixture of run-on and cursive writing. The last type is most difficult and presents the most complex segmentation and recognition task of the five styles depicted in FIG. 1.

This invention is specifically directed to and described in the context of the cursive writing example (W4) and the unconstrained writing example (W5), although the teachings may be extended to the other types.

Figure 2:
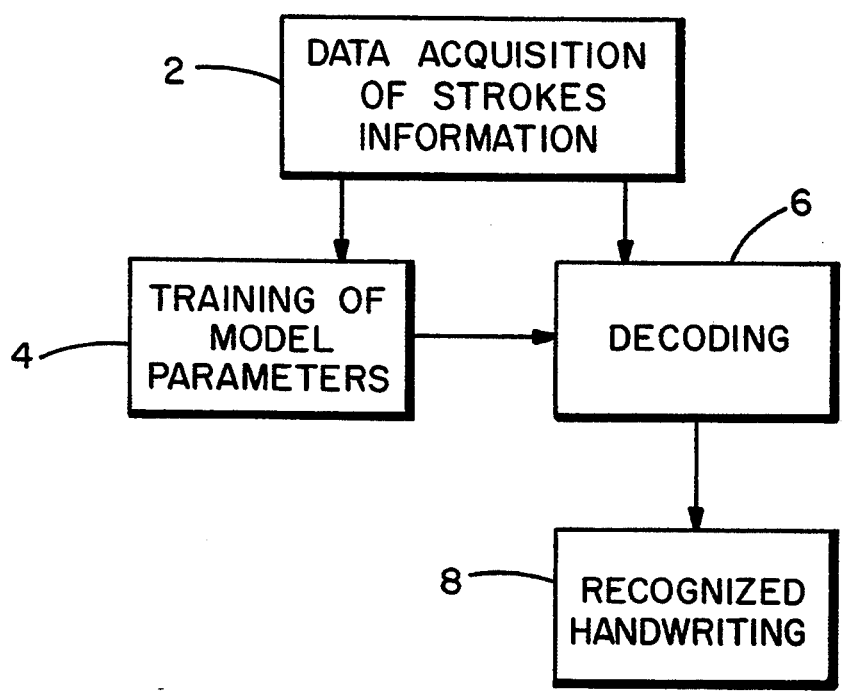
FIG. 2 is a block diagram of a generalized handwriting recognition system emphasizing training and decoding paradigms.

Referring to FIG. 2 there is illustrated, in block diagram form, the operation of a general handwriting recognition system. A generalized discussion of FIG. 2 is first provided, followed by a detailed description of the operation of each of the blocks shown therein. At block 2 there occurs data acquisition of stylus or pen stroke information. Acquired strokes are operated on to recognize the handwriting information. During a training mode of operation, as shown at block 4, the acquired handwriting information is analyzed, in reference to a known, training script, to train the underlying models purporting to represent this information. During use, the model parameters obtained during training are used by decoding block 6, together with feature vectors corresponding to the (unknown) handwriting to be recognized.

Recognized handwriting is thereafter made available for use by block 8. By example, a recognized message may be simply converted to an alphanumeric format and displayed upon a display device. The recognized message may also be provided to any application that would conventionally receive messages from a keyboard such as, by example, a word processing system.

The following presently preferred technique is implemented in the apparatus of FIG. 2.

1. Perform a pre-filtering of the data to normalize for the speed of writing. This is accomplished by converting the time-dependent representation captured by the tablet, where the spacing between points is ballistic in nature, into a time-independent representation, where all the points are equally spaced. Linear-interpolation is performed as necessary to find the resulting equally spaced points. If desired, a cubic spline interpolation can also be performed for a more refined interpolation.

2. For each point $P_n$ of coordinate $((X_n, Y_n)$ in the training data, form a P-dimensional vector $\vec{P}_n$ of feature elements representative of the local pen trajectory around $P_n$. For example, a good choice for P is 6, with feature elements given by:

(i) the horizontal and vertical incremental changes:

$$\Delta x_n = x_n - x_{n-1}, \Delta y_n = y_n - y_{n-1}; \quad (1)$$

(ii) the sine and cosine of the angle of the tangent to the pen trajectory at $P_n$:

$$\cos \theta_n = \Delta x_n / \sqrt{(\Delta x_n)^2 + (\Delta y_n)^2}, \quad (2)$$

$$\sin \theta_n = \Delta y_n / \sqrt{(\Delta x_n)^2 + (\Delta y_n)^2};$$

and (iii) the incremental changes in the above two parameters:

$$\Delta \cos \theta_n = \cos \theta_{n+1} - \cos \theta_{n-1}, \Delta \sin \theta_n = \sin \theta_{n+1} - \sin \theta_{n-1}. \quad (3)$$

It should be noted that the last two parameters provide information about the curvature of the pen trajectory at point $P_n$.

3. For each point $P_n$ of coordinates $(x_n, y_n)$ in the training data, form a P'-dimensional vector $\vec{P}_n$ of feature elements representative of the global pen trajectory up to $P_n$. For example, a good choice for P' is 3, with feature elements given by: (i) the height from the baseline $Y_n$, (ii) the width from the beginning of the stroke $x_n - x_i$, where $x_i$ is the first coordinate of the current stroke, and (iii) the inter-stroke distance if the current character is composed of more than one stroke.

4. For each stroke in the training data, determine a subset of the points $P_n$ in that stroke, say $Q_i$ with the property that the $Q_i$'s are approximately equally spaced. This set includes the first and last points of each stroke, and the spacing interval is some reasonable function of the line height.

5. At each location $Q_i$ obtained in Step 4, construct a Q-dimensional spliced vector by concatenating together the H vectors $\bar{P}_n$ preceding $Q_i$, the vector $\bar{q}_i$ corresponding to $Q_i$, and the H vectors $\bar{P}_n$ following $Q_i$. Similarly, construct a Q'-dimensional spliced vector by concatenating together the H' vectors $\bar{P}_n$ preceding $Q_i$, the vector $\bar{q}_i$ corresponding to $Q_i$ and the H' vectors $\bar{P}'_n$ following $Q_i$. This is realizable provided the following holds:

$$Q = P(2H+1), \quad Q' = P(2H'+1). \quad (4)$$

Good choices are H=H'=20, yielding values Q=246 and Q'=123.

6. Compute the mean vector and covariance matrix of all the Q-dimensional vectors corresponding to local handwriting features. Denote these as $M_t^{(1)}$ and $S_t^{(1)}$, respectively. Similarly, compute the means vector and covariance matrix of all the Q'dimensional vector corresponding to global handwriting features. Denote these. $M_t^{(2)}$ and $S_t^{(2)}$ respectively 7. For n=1,2 compute $E_t(n)$, the eigenvector matrix of $S_t(n)$, and $\Lambda_t(n)$, the diagonal matrix of corresponding eigenvalues. It is noted that these quantities obey the relationship:

$$S_t^{(n)} = E_t^{(n)} \Lambda_t^{(n)} E_t^{(n)T}, \quad (5)$$

where T denotes matrix transposition. Thus, the leading eigenvectors in $E_t^{(n)}$ correspond to the leading eigenvalues in $\Lambda_t^{(n)}$.

8. Using the $R_1$ leading eigenvectors from Step 7, project the Q-dimensional feature vectors of Step 5 onto a space of dimension $R_1$. Call the resulting vectors $\vec{r}_i^{(1)}$. A reasonable value for $R_1$ is 6 At this point the redundancy present in the Q-dimensional spliced feature vectors has been eliminated by concentrating on the most informative feature elements. The space spanned by the vectors $\vec{r}_i^{(1)}$ is referred to as the chirographic space $C^{(1)}$.

9. Similarly, using the $R_2$ leading eigenvectors from Step 7, project the Q'-dimensional feature vectors of Step 5 onto a space of dimension $R_2$, with resulting vectors $\vec{r}_i^{(2)}$. A reasonable value for $R_2$ is 15. Note that $R_2 > R_1$ because there is generally less redundancy present in the (global features) Q-dimensional spliced feature vectors than in the (local features) Q-dimensional spliced feature vectors. The space spanned by the vectors $\vec{r}_i^{(2)}$ is referred to as the chirographic space $C^{(2)}$.

10. Repeat this step for n=1,2. Starting with random cluster assignments, perform K-means Euclidean clustering of the projected vectors $\vec{r}_i^{(n)}$ obtained in Steps 8 and 9, so as to obtain preliminary prototype distributions in the corresponding $R_n$-dimensional chirographic space.

11. Repeat this step for n=1,2. Starting with the preliminary distributions of Step 10, perform K-means Gaussian clustering of the projected vectors $\vec{r}_i^{(n)}$ obtained in Steps 8 and 9, so as to obtain final Gaussian prototype distributions in both chirographic spaces. Denote these prototype distributions as $\pi_k^{(n)}$, and use cluster sizes to estimate the prior probability $Pr(\pi_k^{(n)})$ of each prototype distribution in the respective $R_n$-dimensional chirographic space.

12. Repeat this step for n=1,2. Using the Gaussian distributions from Step 11, compute, for all vectors $\vec{r}_i^{(n)}$ obtained in Steps 8 and 9, the quantity $Pr(r_i^{(n)} | \pi_k^{(n)})$. Also estimate the probability of each feature vector as:

$$Pr(\vec{r}_i^{(n)}) = \sum_{k=1}^{K_n} Pr(\vec{r}_i^{(n)} | \pi_k^{(n)}) Pr(\pi_k^{(n)}), \quad (6)$$

assuming the total number of clusters ion the respective chirographic space is $K_n$. Good choices are $K_1 = K_2 = 400$.

13. Repeat this step for n=1,2. Using the results of Steps 11 and 12, compute the quantity:

$$Pr(\pi_k^{(n)} | \vec{r}_i^{(n)}) = \frac{Pr(\vec{r}_i^{(n)} | \pi_k^{(n)}) Pr(\pi_k^{(n)})}{Pr(\vec{r}_i^{(n)})} \quad (7)$$

and note against which character $a_j$ in the vocabulary considered each vector $\vec{r}_i^{(n)}$ is aligned in the training data.

14. Repeat this step for n=1,2. For each character $a_j$ in the vocabulary considered, pool together all the $\vec{r}_i^{(n)}$ which have been aligned against it and accumulate the corresponding $Pr(\pi_k^{(n)} | \vec{r}_i^{(n)})$. After normalization, this provides an estimate of $Pr(\pi_k^{(n)} | a_j)$ the prior probability of each prototype distribution in the respective chirographic space given each character $a_j$. This completes the the training phase.

15. Repeat steps 1–5 and 8–9 on test data, so as to produce test feature vectors in the same respective chirographic spaces as the training data.

16. For each frame of data $f_i$, represented in the chirographic space $C^{(1)}$ by $\vec{r}_i^{(1)}$ and in the chirographic space $C^{(2)}$ by $\vec{r}_i^{(2)}$, use the Gaussian mixture distributions obtained in Step 11 and the prior probabilities obtained in Step 14 to form quantity:

$$Pr(f_i | a_j) = Pr(\vec{r}_i^{(1)} | a_j)) Pr(\vec{r}_i^{(2)} | a_j)) = \quad (8)$$

$$\left( \sum_{k=1}^{k_1} Pr(\vec{r}_i^{(1)} | \vec{\pi}_k^{(1)}) Pr(\pi_k^{(1)} | a_j) \right)^{1-\alpha} \left( \sum_{k=1}^{k_2} Pr(\vec{r}_i^{(2)} | \vec{\pi}_k^{(2)}) Pr(\pi_k^{(2)} | a_j) \right)^{\alpha}$$

, i.e. the weighted product of two single Gaussian mixture distributions covering the entire chirographic label alphabet. In this expression, alpha controls the influence of the second codebook relative to the first. A good value for alpha is 0.7. It remains to multiply the scores of successive frames to obtain the overall score for a tentative sequence of frames, thus completing the decoding process.

Figure 3:
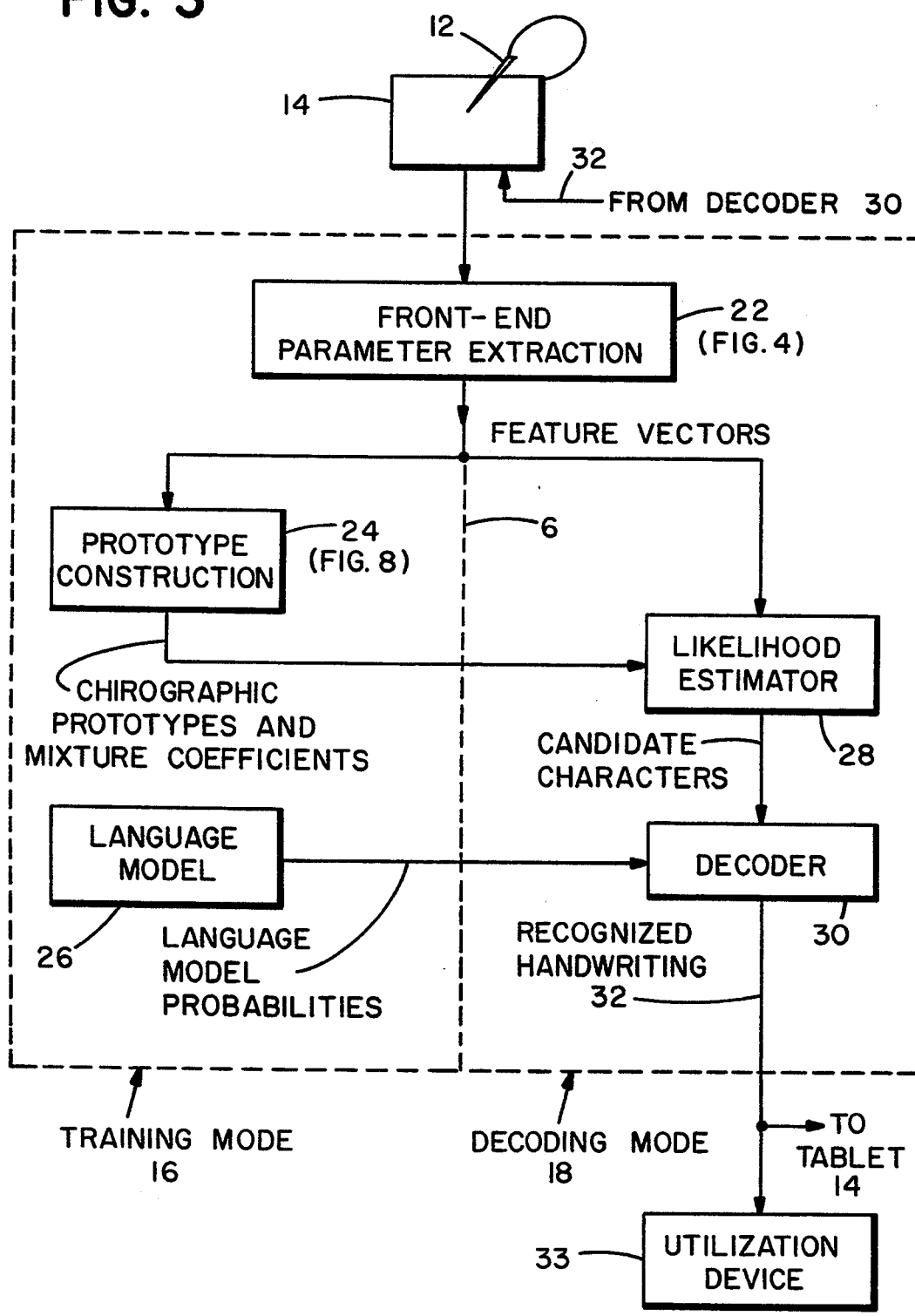
FIG. 3 is a block diagram of a handwriting recognition system according to the present invention.

FIG. 3 is a block diagram of a handwriting recognition system that implements the method set forth above in Steps 1–15. A general purpose computer 10, which for example may be an IBM 3090/VF or an IBM RS 6000, receives character or stroke information produced by a user using a handwriting transducer, typically a stylus 12 that writes on an electronic tablet 14. The character or stroke information may be displayed on the electronic tablet 14 or another display device (not shown). The computer 10 can be used either in training mode 16 or in decoding mode 18.

This is symbolically represented by a dotted line 20. In either the training mode or the decoding mode a front-end parameter extraction block 22 is applied. In training mode 16 the system includes a prototype construction block 24 and a language model block 26. In decoding mode 18 the system includes a likelihood estimator 28 and a decoder 30.

The blocks 22-30 are shown as functional program modules, however, it is to be appreciated that some or all of these functional blocks may be implemented in hardware form instead of software form.

The front-end parameter extraction block 22, which performs Steps 1 to 9 of the handwriting recognition method set forth above, provides feature vectors to the prototype construction block 24, during training mode, or the likelihood estimator block 28, during decoding mode. The prototype construction block 24 performs steps 10-14 of the handwriting recognition method to produce (i) chirographic prototypes representing suitable portions of characters and (ii) mixture coefficients indicating how to combine them. This information is used in the decoding mode to determine, or recognize, unknown characters. The language model block 26 provides language model probabilities which may be used to determine what characters are most likely to occur in a given context, or what words are most likely to occur in a given context. During the recognition mode the likelihood estimator 28, which performs Step 16 of the handwriting recognition method, receives feature vectors from block 22 which have been produced from the unknown strokes or characters to be recognized. These feature vectors lie in the same chirographic space(s) as the chirographic prototypes from block 24, and can therefore be compared to each of them to evaluate the contribution of each of them to each particular feature vector. This information is integrated using the mixture coefficients produced during training to compute the likelihood that each particular feature vector "belongs" to a character in the alphabet. Over all the feature vectors, this can be used to produce candidate characters for recognition to decoder 30. Decoder 30 integrates into the overall score the language model probabilities from block 26 corresponding to the maximum score. Recognized handwriting is then produced at output 32 of decoder 30. The recognized handwriting may be displayed on the tablet 14, or may be provided to a utilization device 33, which for example may be a display device, printer, application program or the like.

Refer now to FIG. 4 which is a detailed block diagram of front-end parameter extraction block 22 which is shown generally in FIG. 3. Each sampled point of handwriting is represented by a point which is defined by coordinates $x_n$ and $y_n$ which are provided to a pre-filtering block 34 which performs step 1 of the handwriting recognition method set forth above. These points are ballistically spaced as shown in FIG. 5. That is, the spacing of the points is a function of the velocity or speed of writing which the writer used to form the current character. For a variety of reasons, writers are seldom consistent in their velocity or writing speed, which may introduce high error rates in handwriting recognition. The pre-filtering block 34 normalizes the points of FIG. 5 to provide equally spaced points $x_m$ and $y_m$ comprising a character, as shown in FIG. 6, which is provided to a parameter extraction block 36, which performs Steps 2 and 3 of the handwriting recognition method for providing the vector $\bar{v}_m$. Details of this parameter extraction are described below relative to FIGS. 11, 12, 13 and 14. The vector $\bar{v}_m$ is provided to a windowing block 38, which performs Steps 4 and 5 of the handwriting recognition method, for providing a spliced vector $\bar{S}_i$. Details of how the spliced vector $\bar{S}_i$ is provided is described below relative to FIGS. 14, 15, and 16. The spliced vector $\bar{S}_i$ is provided to a projection block 40, which performs Steps 6-9 of the handwriting recognition method, for producing a feature vector $\bar{r}_i$. This eliminates redundancy in the spliced parameter vectors. Details of the function of block 40 are set forth relative to FIG. 17. Projection block 40 responds to the spliced vector $\bar{S}_i$ to provide a feature vector $\bar{r}_i$ which is provided to the prototype construction block 24 and the likelihood estimator 28, as previously explained with respect to FIG. 3. Details of projection block 40 are set forth relative to the flow chart of FIG. 17.

Figure 7:
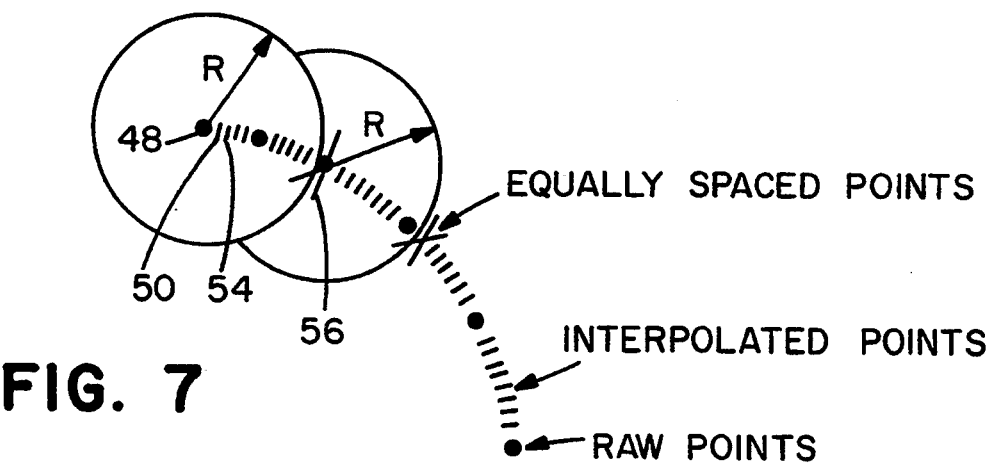
FIG. 7 illustrates how the top $\frac{1}{4}$ of the ballistically spaced character of FIG. 5 is transformed to the equally spaced character of FIG. 6.
Figure 8:
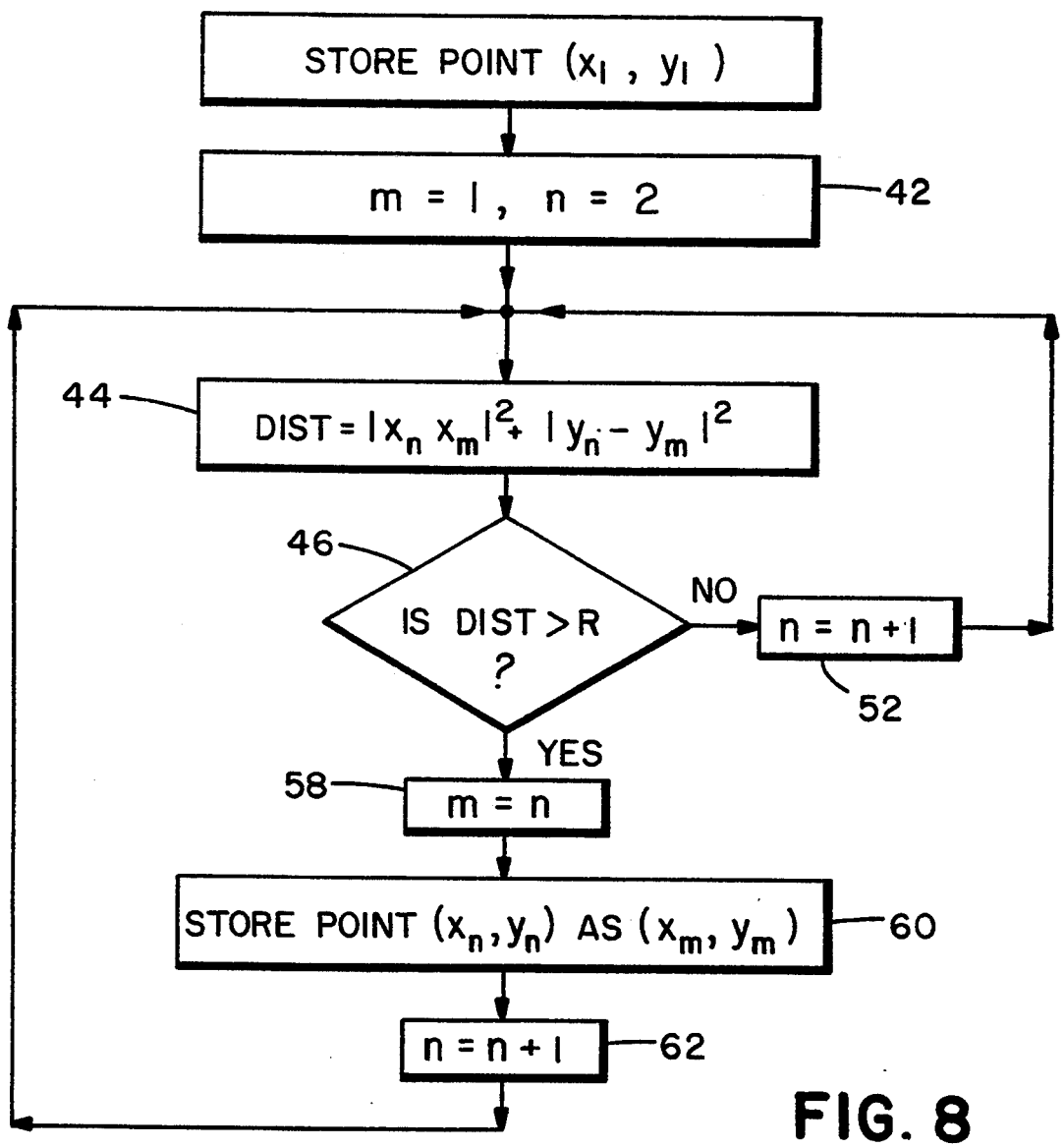
FIG. 8 is a flow chart detailing how the pre-filtering block of FIG. 4 functions to transform the ballistically spaced character of FIG. 5 to the equally spaced character of FIG. 6.

Details of how the ballistically spaced character of FIG. 5 is normalized by pre-filtering block 34 (FIG. 4) to produce the equally spaced character of FIG. 6 is now explained relative to FIGS. 7 and 8, which illustrate how Step 1 of the handwriting recognition method is performed. FIG. 7 is representative of the upper ¼ curved portion of FIG. 5. First, the density of points is increased by performing some interpolation between the original raw points (denoted by a dot). This results in a sequence of points comprising the set of original raw points (.) and the interpolated points (|). Then, filtering is accomplished by a priori determining that equal spacing between points is a distance r suitably related to the distance between two pels as manifested on the electronic tablet 14 (FIG. 3). In FIG. 7, this results in a sequence of points, after filtering, denoted by an X (at 56). Raw and interpolated points are considered to be at equally-spaced integer points n, and filtered points are considered to be equally-spaced integer points m.

With respect to FIG. 8, at block 42 the position at n=1 at the first (raw) point 48 of the stroke is designated at m=1, considered also the first filtered point. The second point 50 of the stroke at n=2 is the first point to be tested for filtering. At block 44 the (Euclidean) distance between the points m and n is determined according to the relationship:

$$\text{distance} = |x_n - x_m|^2 + |y_n - y_m|^2$$

At block 46 a determination is made as to whether the determined distance is greater than R. With reference to FIG. 7, point m=1 is point 48 and point n=2 is point 50. It can be seen that distance is less than R in FIG. 7, therefore the point is rejected and the method proceeds to block 52 where n is incremented to 3, point 54. Distance is again computed in block 44 and compared with R in block 46. Eventually the distance becomes greater than R, so the point 55 is accepted (m is made equal to n in block 58). At block 60 the point $(x_n, y_n)$ is stored as a filtered point $(x_m, y_m)$, point 56, which is the 12th point. At block 62 n is incremented by 1, and a return is made to block 44 where raw and interpolated points are treated as explained above.

Figure 10:
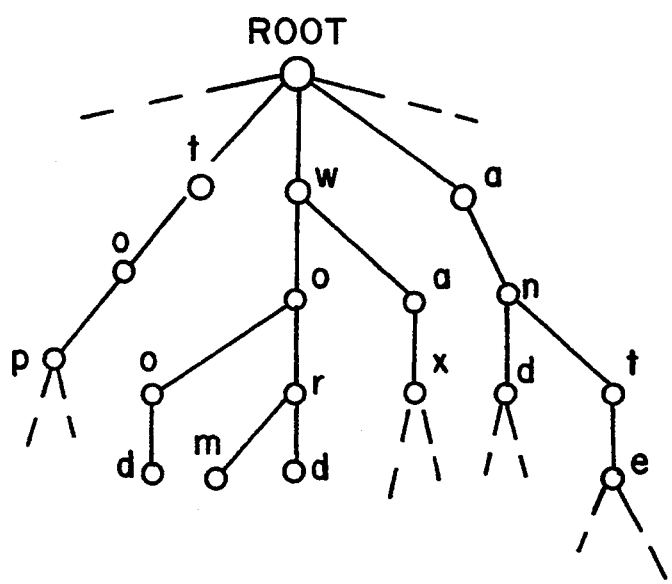
FIG. 10 illustrates an exemplary trie data structure that is employed for representing a multi-word vocabulary in accordance with an aspect of this invention.
Figure 11:
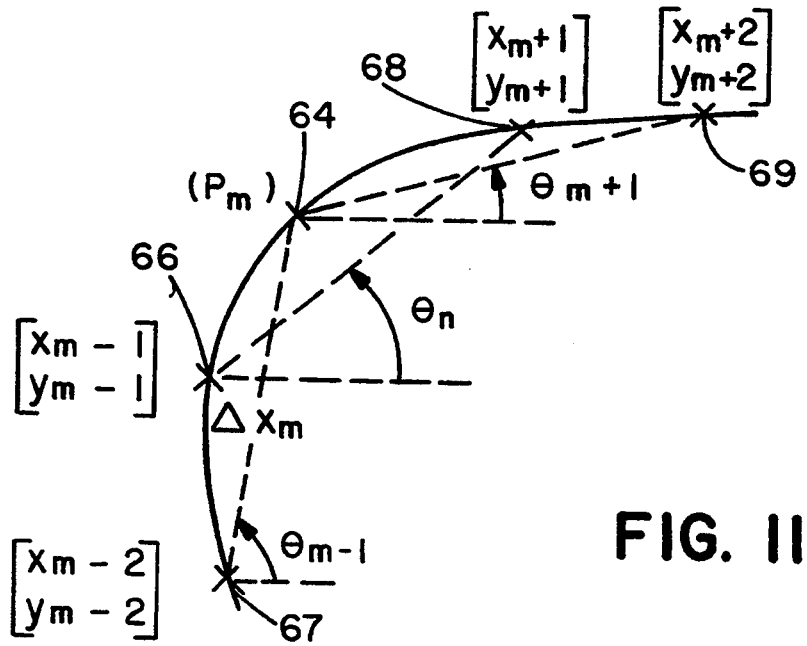
FIG. 11 illustrates a portion of a handwritten character being processed to generate a first parameter vector for a point (P)
Figure 13:
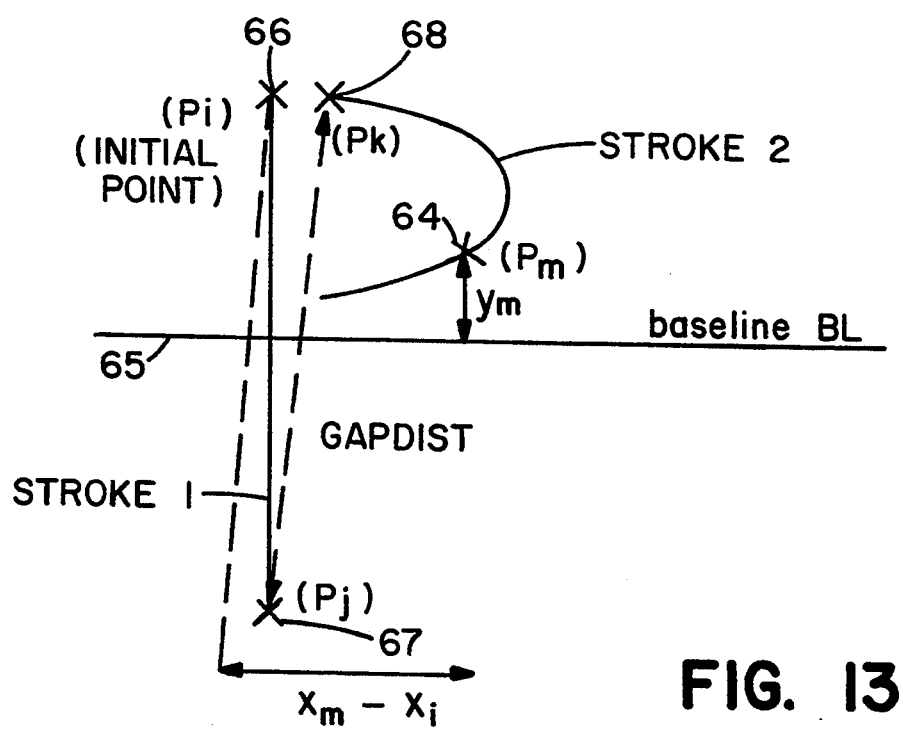
FIG. 13 illustrates a handwritten character being processed to generate a second parameter vector for a point (P)

FIGS. 11, 12, 13 and 14 illustrate how parameter extraction, block 36 of FIG. 4, which performs steps 2 and 3 of the handwriting recognition algorithm, is derived according to this invention for providing a parameter vector $\bar{v}_m$. FIG. 11 shows the local parameter extraction, FIG. 12 the local parameter vector, FIG. 13 is the global parameter extraction, and FIG. 14 the global parameter vector. There are 6 local coordinates in the local parameter vector and 3 global coordinated in the global parameter vector, for a total of 9 coordinates. That is, 5 more coordinates are generated than the 4 coordinates of the prior art as shown in FIG. 10. For the local parameter vector, calculations are made relative to a current point 64 relative to previous points 66 and 67 and following points 68 and 69. The specific calculation for local parameter vectors are shown in FIG. 12. For the global parameter vector, calculations are made relative to a current point 64 relative to baseline 65, initial point of the character 66, last point of the first stroke 67, and the first point of the second stroke 68. The specific calculation for global parameter vector are shown in FIG. 14. With out loss of generality, the rest of this section will illustrate the handwriting recognition algorithms for one codebook only, i.e., either the local parameter vectors or the global parameter vectors. p Details of the windowing block 38 of FIG. 4 are now set forth relative to FIGS. 15 and 16 to show how feature events are extracted from the data. A small number of approximately equidistant feature points are determined using the same algorithm as in FIG. 8, but with a different value of R, and parameter vectors are spliced at those points. The number (2H+1) of parameter vectors to be spliced at each point is determined a priori, which in turn specified the splicing dimension $Q=(2H+1)P$.

Figure 15:
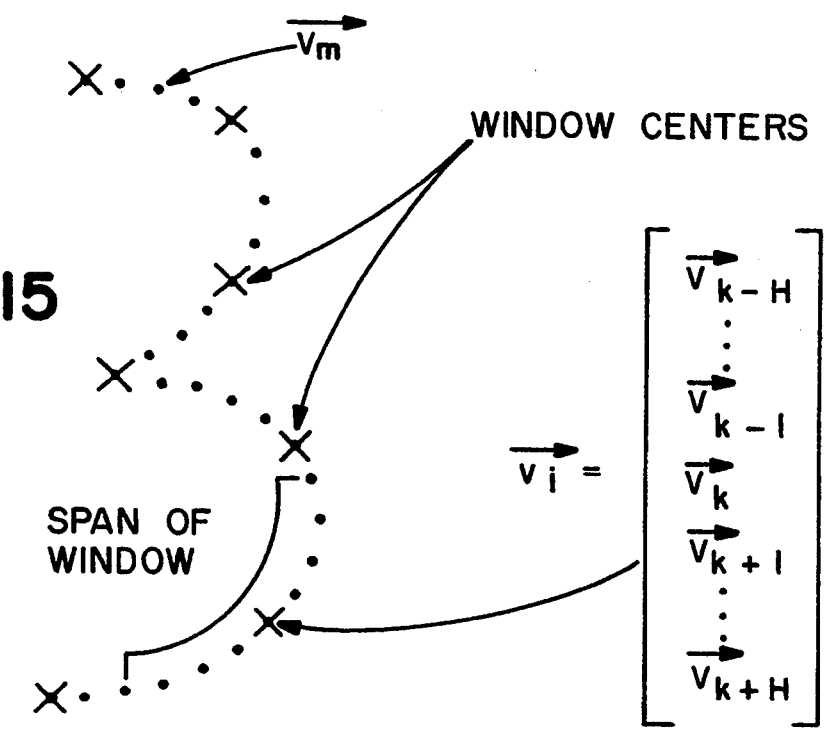
FIG. 15 illustrates how windowing is accomplished on a character by concatenation of individual parameter vectors as extracted in FIGS. 12 and 14.

Referring to FIG. 15, feature points are shown by dots, and window centers are shown by an x. Dots are referenced as points k, and X's are referenced by index i as points $k_i$. With respect to FIG. 16, at block 70 i and a counter j are each set equal to 1. At block 72, k is set to $k_i$-H and at block 74 the corresponding $\bar{V}_k$ (of dimension P) is obtained. A determination is then made at block 76 whether or not $(2H+1)\bar{v}_k$ have been seen. If so, j is reinitialized to 1 and i is incremented by 1 in block 78 and the procedure repeats as just explained. If not, $\bar{V}_k$ is appended to $\bar{V}_i$ starting at position $(j-1)P+1$. k and j are both incremented by 1 in block 82 and a return is made to block 74 to get the next $\bar{v}_k$, and the procedure repeats as just explained.

Figure 17:
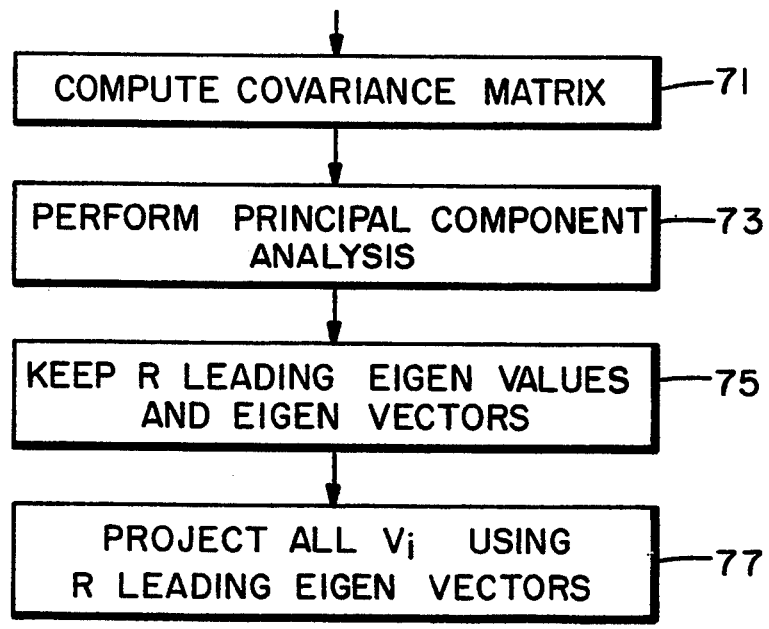
FIG. 17 is a flow chart detailing how the projection block of FIG. 4 functions to produce a feature vector from the spliced vectors obtained in FIG. 16.

Referring to FIG. 17 the function of the projection block 40 of FIG. 4, which performs steps 6-9 of the handwriting recognition method, is explained in detail. The projection block is utilized to eliminate redundancy in the splice parameter vectors from the windowing block 38. A covariance matrix is computed for all spliced vectors in block 71, and the associated eigenvalue and eigenvectors are found through principal component analysis, in block 75. Using the R leading eigenvalues and eigenvectors of block 74, the spliced vectors are projected in block 77 onto a subspace of smaller dimension called chirographic space, resulting in the projected vectors $\bar{r}_i$. How a covariance matrix is computed is described in "Matrix Computations" by J. H. Golub and C. F. Van Loan, John Hopkins, University Press, Baltimore, 1989. This reference also teaches how to perform a principal component analysis at block 73, and how to project all $S_i$ at block 77.

Figure 18:
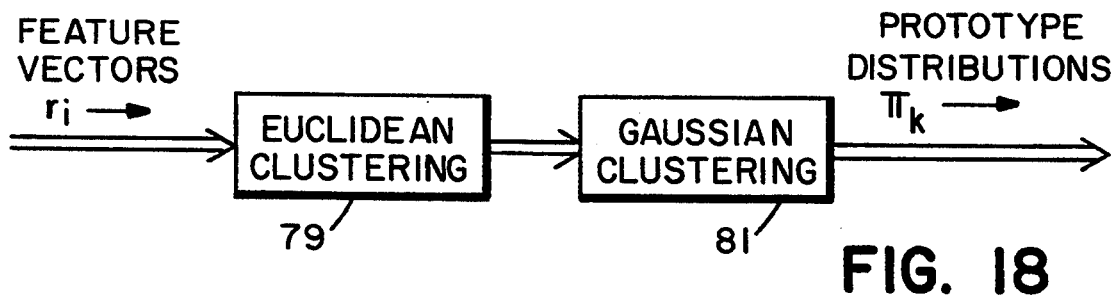
FIG. 18 is a detailed block diagram of the prototype construction block of FIG. 3.
Figure 19:
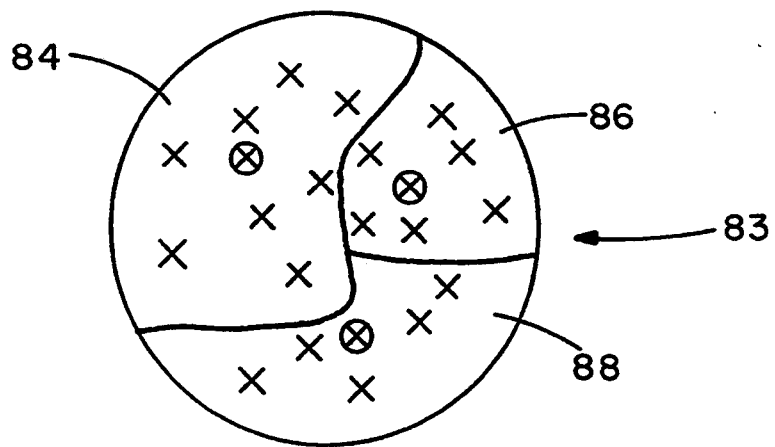
FIG. 19 is a diagram illustrating K-means clustering.

The chirographic space is then partitioned as shown in FIG. 18 and 19, which details the prototype construction block 24 of FIG. 3, to produce chirographic prototypes. The feature vectors are provided to block 79 to perform k-means Euclidean clustering. Details of block 79 are set forth relative to FIGS. 19 and 20. The results of Euclidean clustering are provided to block 81 to perform k-means Gaussian clustering to provide prototype distributions $\bar{\pi}_k$. Details of block 81 are set forth relative to FIG. 21. FIGS. 18-21 detail how steps 10 and 11 of the handwriting recognition algorithm are performed. The prototype distributions or chirographic prototypes are provided to likelihood estimator 28 (FIG. 3) to produce candidate characters to decoder 30 (FIG. 3). How to generally accomplish k-means clustering is described in "Clustering Algorithms" by J. A. Hartigan, J. Wiley, 1975.

FIG. 19 illustrates a space 83 which is divided into clusters 84, 86 and 88. Each cluster includes a plurality of vectors indicated as points x, with a centroid ⊗ being computed for each such cluster of vectors.

Figure 20:
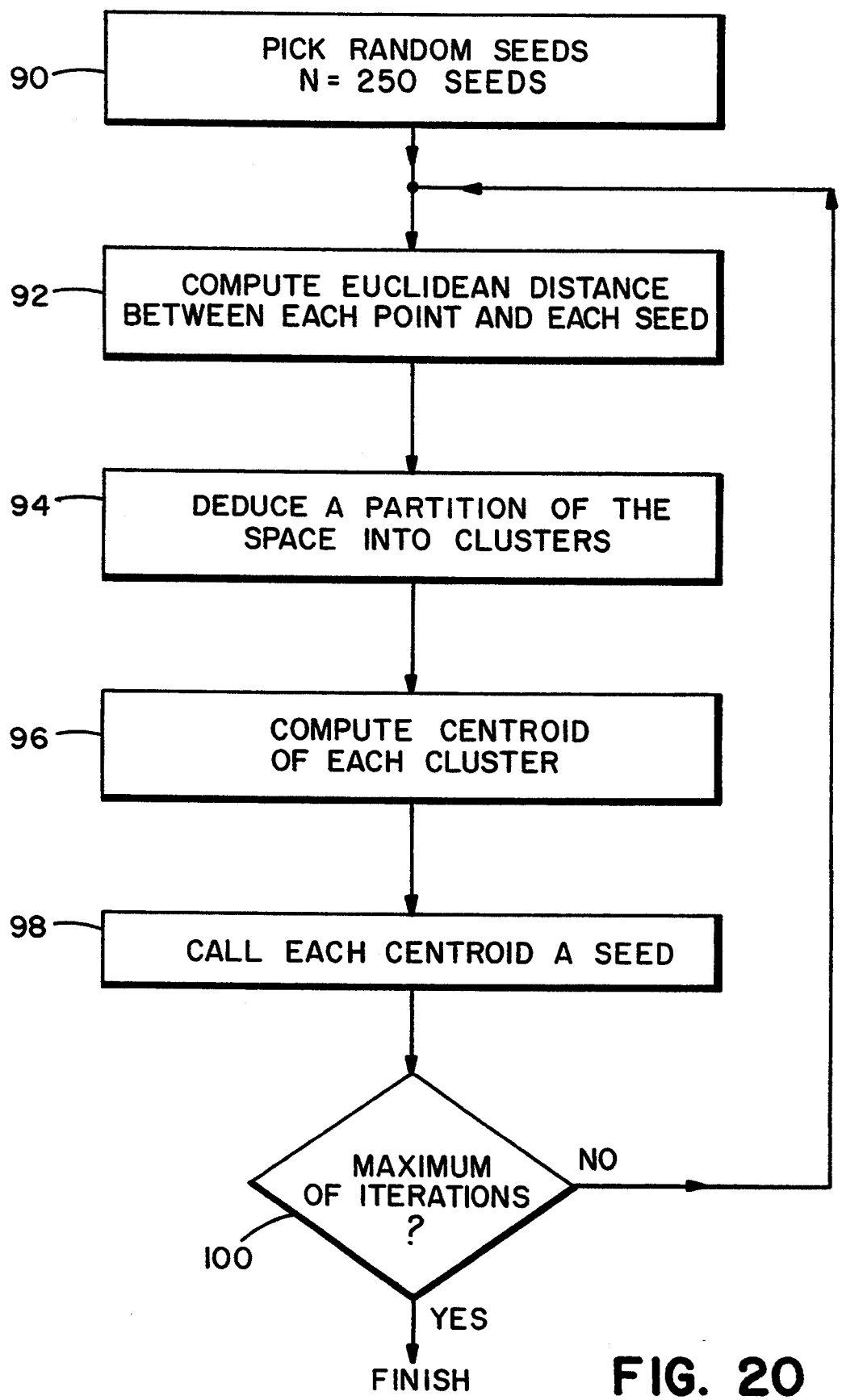
FIG. 20 is a flow chart detailing how the Euclidean K-means clustering block of FIG. 18 functions.

Refer to FIG. 20 which details block 79 of FIG. 18. A number of random seeds, chosen to be 250, is picked at block 90 from all the points in the chirographic space obtained from block 22 in FIG. 3. The Euclidean distance between each point and each seed is calculated at block 92. By assigning each point to its closest seed, the space is partitioned into clusters at block 94. This corresponds to the clusters 84, 86 and 88 of FIG. 19. The centroid of each cluster is computed at block 96. This corresponds to the ⊗ in FIG. 19. These centroids are set to replace the original seeds at block 98. At decision block 100 a determination is made if the maximum number of iterations is reached. If not, a return is made to block 92 and the steps are repeated as just described. If so, the calculation of the Euclidean clustering is complete.

Figure 21:
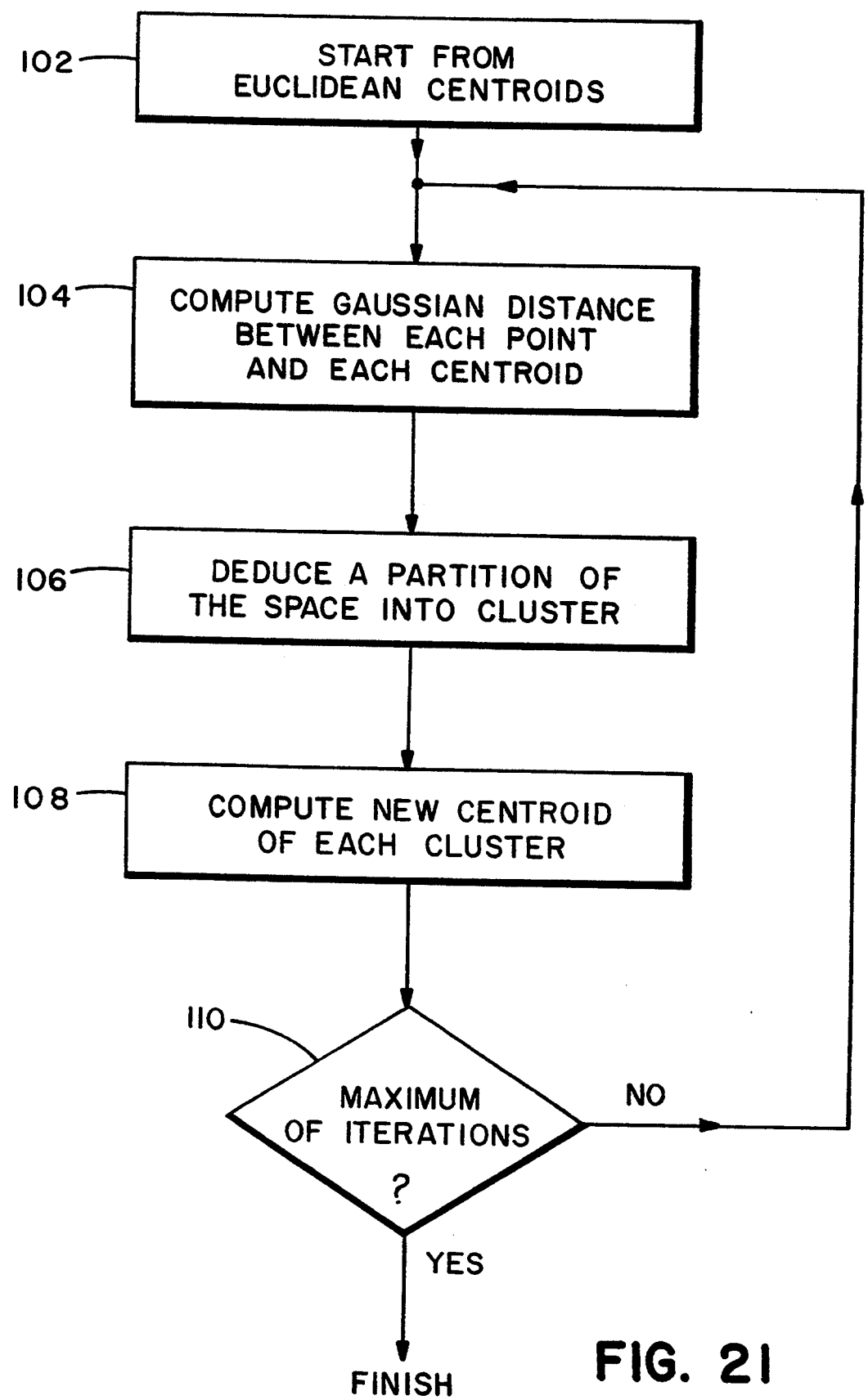
FIG. 21 is a flow chart detailing how the Gaussian K-means clustering block of FIG. 18 functions.

Refer to FIG. 21 which details the Gaussian clustering block 81 of FIG. 18. The Euclidean clusters obtained in block 79 (FIG. 18) are provided at block 102. The Gaussian distance between each point and each centroid is calculated at block 104. By assigning each point to its closest centroid, the space is partitioned into clusters at block 106. The new centroid of each cluster is computed at block 108. At decision block 110 a determination is made if the maximum number of iterations is complete. If not, a return is made to block 104 and the steps are repeated as just described. If so, the calculations of the Gaussian clustering is complete. This results in final prototype distributions in chirographic space.

Figure 22:
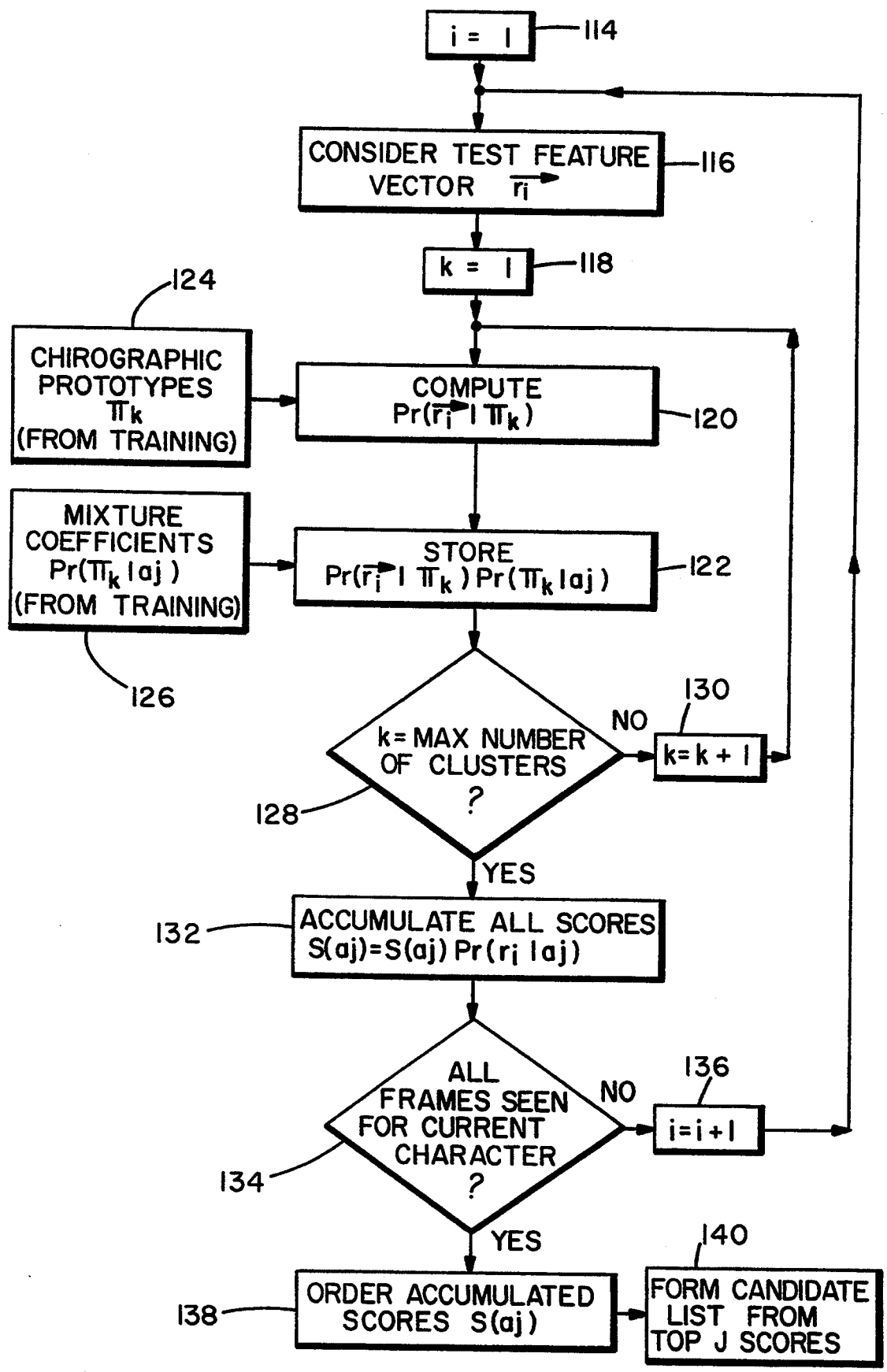
FIG. 22 is a flow chart detailing how the likelihood estimator block of FIG. 3 functions.

Refer to FIG. 22, which performs step 16 of the handwriting recognition technique for one codebook only, which illustrates how information resulting from steps 12 and 13 of the handwriting recognition method is operated on by the likelihood estimator 28 of FIG. 3 to produce candidate characters for the decoder 30. At block 114 a variable i, which is indicative of the current frame (or window center), is initialized to 1, and the test feature vector is provided from the front end parameter extraction 22 (FIG. 4) as indicated at block 116. At block 118 a variable k representative of the current prototype distribution is initialized to k=1. The conditional probability of this feature vector given this prototype distribution is computed at block 120 and is provided to block 122.

The prototype construction block 24 (FIG. 3) of the training phase as represented by the chirographic prototype distributions $\pi_k$ in block 124 and mixture coefficients $\Pr(\pi_k|a_j)$ in block 126 are also provided to block 122 where the combined probability is computed and stored. At decision block 128 a determination is made if k has reached the maximum number of clusters. If not, k is incremented by 1 as indicated at block 130, and a return is made to block 120 and the just recited process is repeated. If so, the scores just stored are accumulated at block 132 for all characters $a_j$ in the underlying alphabet. At decision block 134 a determination is made if all frames i have been seen for the current character under consideration. If not, i is incremented by 1 at block 136 and a return is made to block 116 and the just recited process is repeated. If so, the accumulated scores are ordered in block 138 and a candidate list of characters $a_j$ is formed from the top J scores for provision to the decoder 30 (FIG. 3).

Figure 23:
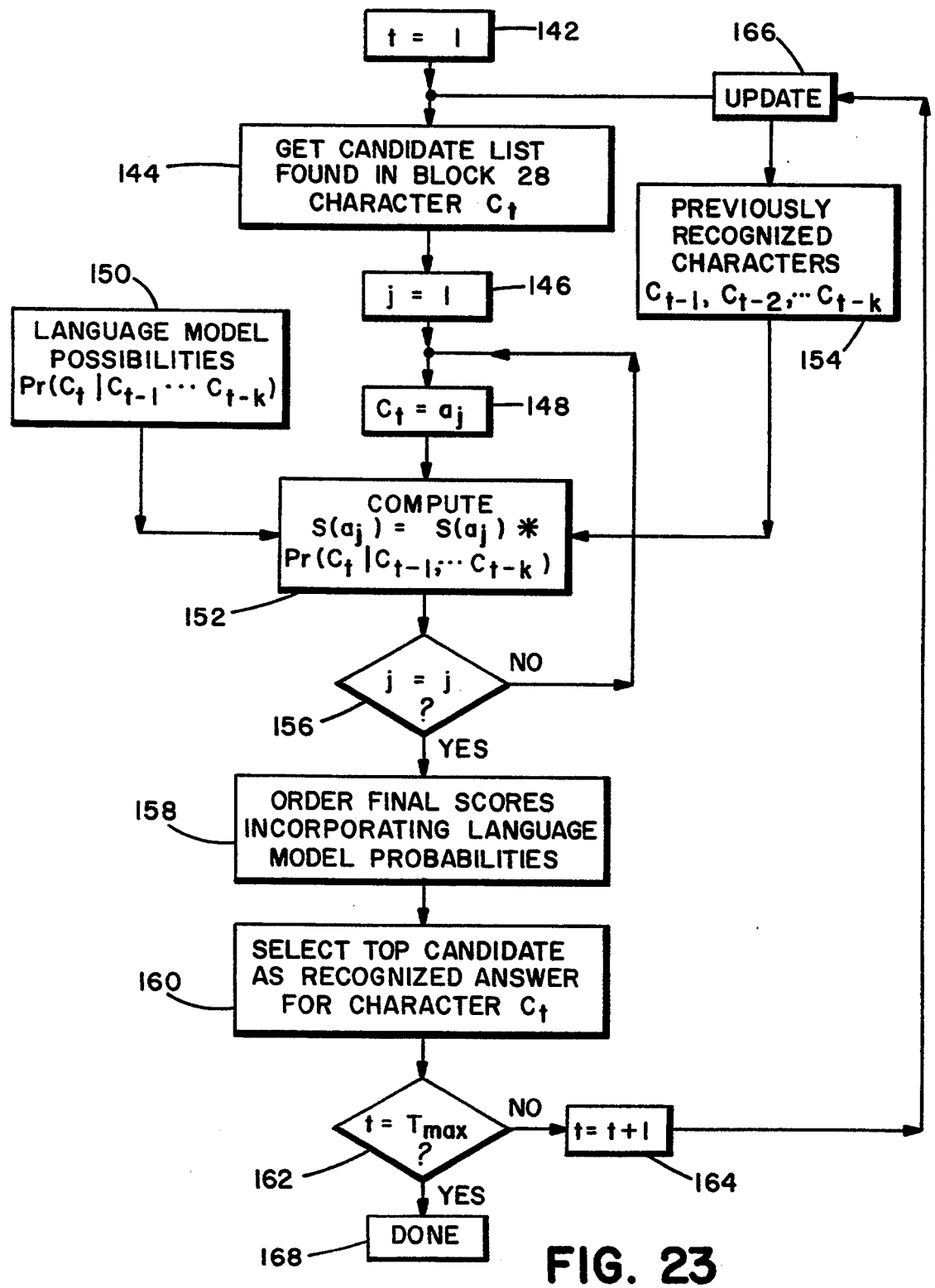
FIG. 23 is a flow chart detailing how the decoder block of FIG. 3 functions.

Refer now to FIG. 23 which is a flow chart representation indicative of the operation of the decoder 30 (FIG. 3). A variable t, which is indicative of the current character under consideration, is initialized to 1 at block 142. The candidate list of characters from the likelihood estimator 28 (FIG. 3) for character $C_t$ is provided at block 144. A variable j indicative of the current candidate character is initialized to 1 at block 146, and $C_t$ is tentatively set equal to $a_j$ at block 148. From the training block, Language Model probabilities 26 (FIG. 3) are provided at block 150. Based on these probabilities and previously recognized characters at block 154, the final score of the character $a_j$ is computed at block 152. This score represents the likelihood that $C_t$ is recognized as $a_j$ taking into account the contentual information through the language model. At decision block 156 a determination is made if j=J, the index of the last candidate character in the candidate list provided by the likelihood estimator 28. If not, a return is made to block 148 and the just recited process is repeated. If so, final scores incorporating language model probabilities are ordered in block 158. The top candidate is selected as the recognized answer for character $C_1$ in block 160. At decision block 162 a determination is made if t =Tmax, the index of the last character in the string to be recognized. If not, t is incremented by 1 in block 164, to get the next character to be recognized. An update is made at block 166, to insert the recognized $C_1$ in block 154, and a return is made to block 144, with the just recited process being repeated. If so, the process is complete as indicated at block 168 and the whole string of characters has been recognized.

Having described in detail a method and apparatus for partitioning the input strokes into overlapping windows or frames, a presently preferred embodiment of the likelihood estimator 28 and decoder 30 for accomplishing cursive and unconstrained mixed cursive and discrete handwriting word recognition, as opposed to character recognition as depicted in FIG. 23 and described above, is now provided.

Figure 16:
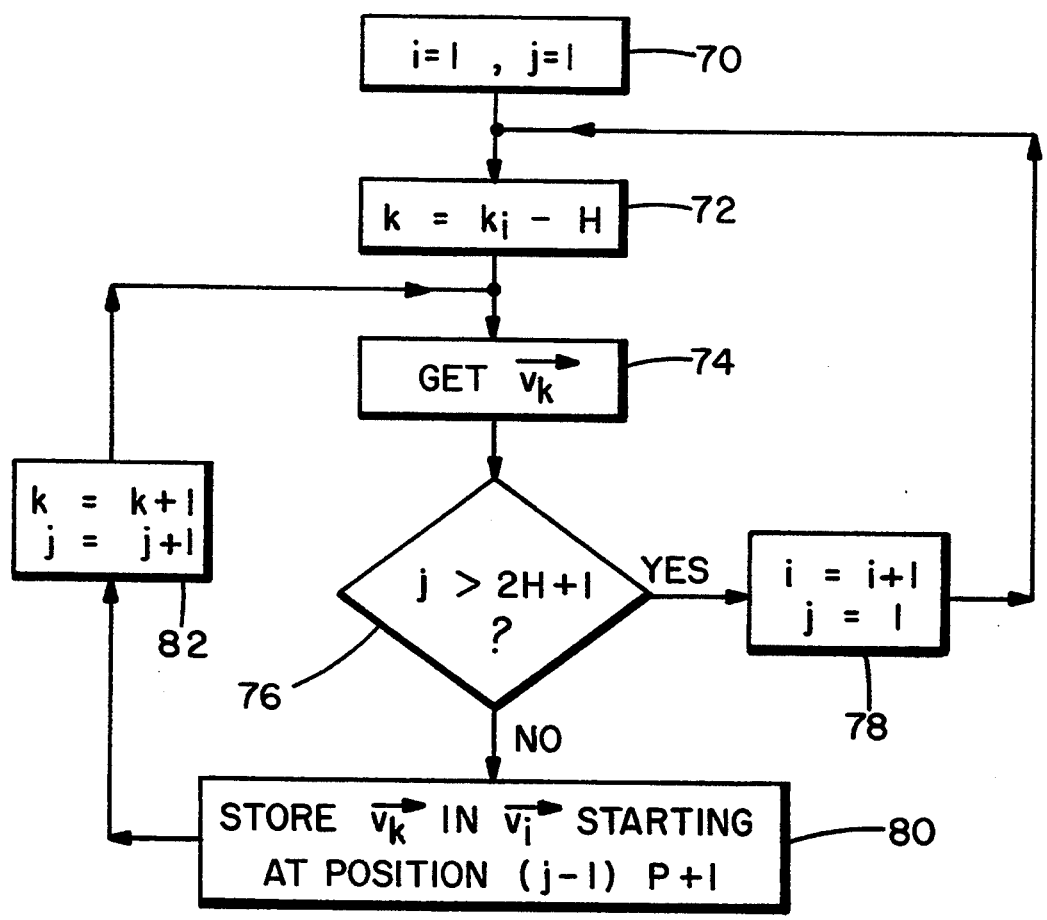
FIG. 16 is a flow chart detailing how the windowing block of FIG. 4 functions to perform the concatenation of the parameter vectors illustrated in FIG. 15 and thereby produce spliced vectors.

The pre-processing occurs as described in detail above. That is, input strokes are captured from the tablet 14. The strokes, from pen-down to pen-up, are partitioned into equi-length N overlapping sub-strokes within windows or frames, as shown in FIGS. 15 and 16.

Figure 9:
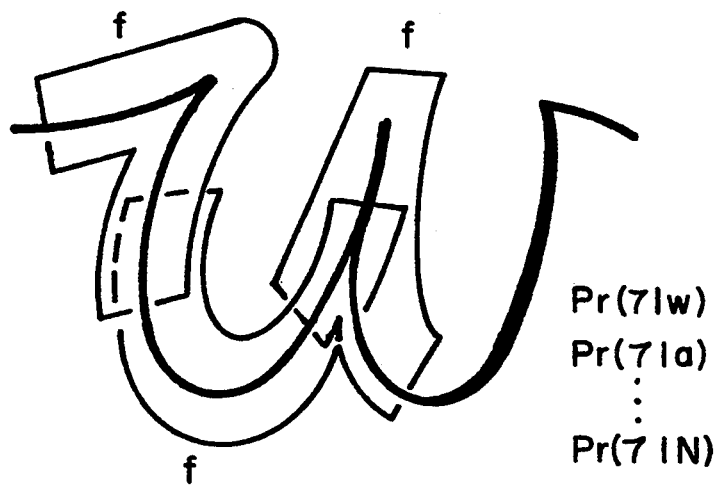
FIG. 9 illustrates a handwritten "w" character and shows a plurality of equi-length, overlapping windows or frames that partition the character into sub-strokes.

FIG. 9 illustrates a portion of a cursively written word, specifically an initial character which happens to be a lower case "w". The sequence of frames from the beginning of a word to the end of a word is represented as $F=(f_0f_1...f_n)$. Due to the operation of method described above, the frames $f_0$, $f_1$, and $f_2$ can be seen to overlap one another, it being realized that the unillustrated frames $f_4$ through $f_n$ also overlap in a similar manner.

The method of this invention employs two pre-processing components that operate as described previously. The first component, a splicer, converts strokes into frames. The second component, a Frame Shape Recognizer, associates conditional probabilities to each frame. The detail of the frame as well as the details of these pre-processing components are described in detail above.

As seen in FIG. 9, there is associated with each frame, for example $f_0$, a probability that the sub-stroke contained within the frame is associated with a given character. That is, the probability $P_o(f_j|a_i)$ denotes the probability that the frame $f_j$ appears as part of an alphabet $a_i$.

The method described below employs word 1-gram statistics $\{(P_1(w^i))\}$ for words in vocabulary $W=(w^0, w^1 ... w^v)$, thus $$\left(\sum_i P_1(w^i) = 1\right).$$

Extensions to use 2-gram and 3-gram statistics are readily achievable.

For a given F and W, the method disclosed herein derives a plurality of conditional probabilities. The task of recognition is to find the $w_i$ which maximizes the conditional probability:

$$P_2(w^i|F) = \frac{P_3(F|w^i) \times P_1(w^i)}{P_4(F)}$$

In determining the word $w^i$ which maximizes the probability, the denominator $P_4$ can be neglected because the term is invariant on the choice of word $w^i$. $P_1$, on the other hand, is obtained from the input dictionary. Thus, $P_3$ is of interest.

Letter-alignment Model by Dynamic Programming

For the given word $w^i$ with L letters $w^i=(c^i_1, c^i_2 ... c^i_L)$ and N input frames: $F=(f_0, f_1 ... f_n)$, there are many possible letter-frame alignments $A(L,N)=(a_1, a_2 ... a_m)$. Each $a_j$ represents one manner of grouping N frames into L groups ($F^{a_j}=(\hat{f}_1, \hat{f}_2 ... \hat{f}_L)$.) Each of $\hat{f}_j$ is a group of frames and corresponds to a letter of the word $c^i_j$. With this letter-frame alignment, the probability $P_3$ of interest can be further re-formulated.

$$P_3(F|w^i) = \underset{a_j \in A(L,N)}{MAX} P_4(F|w^i, a_j)$$

$$P_4(F|w^i, a_j) = P_4(F|\{c^i_0 c^i_1 ... \}a_j) =$$

$$P_5(a_j) \times P_6(\hat{f}_1 c^i_1) \times P_6(\hat{f}_2 c^i_2) ... \times P_6(\hat{f}_L c^i_L)$$

$P_5$ is approximated by a distribution of a number of frames (width) $P_7$ of each letter:

$$P_5(a_j) = \frac{\prod_{k=1}^{L} P_7(\text{width}(\hat{f}_k))}{\sum_{k=1}^{M} \prod_{m=1}^{L} P_7(\text{width}(\hat{f}^m_k))}$$

$P_6$ also can be estimated from the $P_o$ which are associated to each frame, as $$P_6(\hat{f}_1|c^i_1) = P_6(\hat{f}_{i_1}\hat{f}_{i_2} ... |c^i_1) = P_o(\hat{f}_{i_1}|c^i_1) \times P_o(\hat{f}_{i_2}|c^i_1) \times ...$$

Computation of the conditional probability $P_3(F w^i)$ is preferably performed by a dynamic programming procedure as follows.

1. Prepare a two dimensional array G[0:L,0:N](N: number of frames, L: number of letters in $w^i$).
2. Set G[0:L,0:N]=0.0;G[0,0]=1.0
3. Repeat steps 4,5 and 6 from l=0 until l=L−1.
4. Repeat steps 5 and 6 from n=0 until n=N−1.
5. Repeat step 6 from m=L0 until m=L1.
where (L0<L1)

L0: minimum number of frames a letter may occupy
L1: maximum number of frames a letter may occupy
6. Update G[l+1,n+m] in the following manner:

$$G[l+1, n+m] = \max\left(G[l+1, n+m], G[l,n] + P_7(m) + \prod_{p=l+1}^{l+m} P_0(f_p | c^j_{l+1})\right)$$

7. When the iteration ends, G[L,N] contains the probability being determined.

Figure 24:
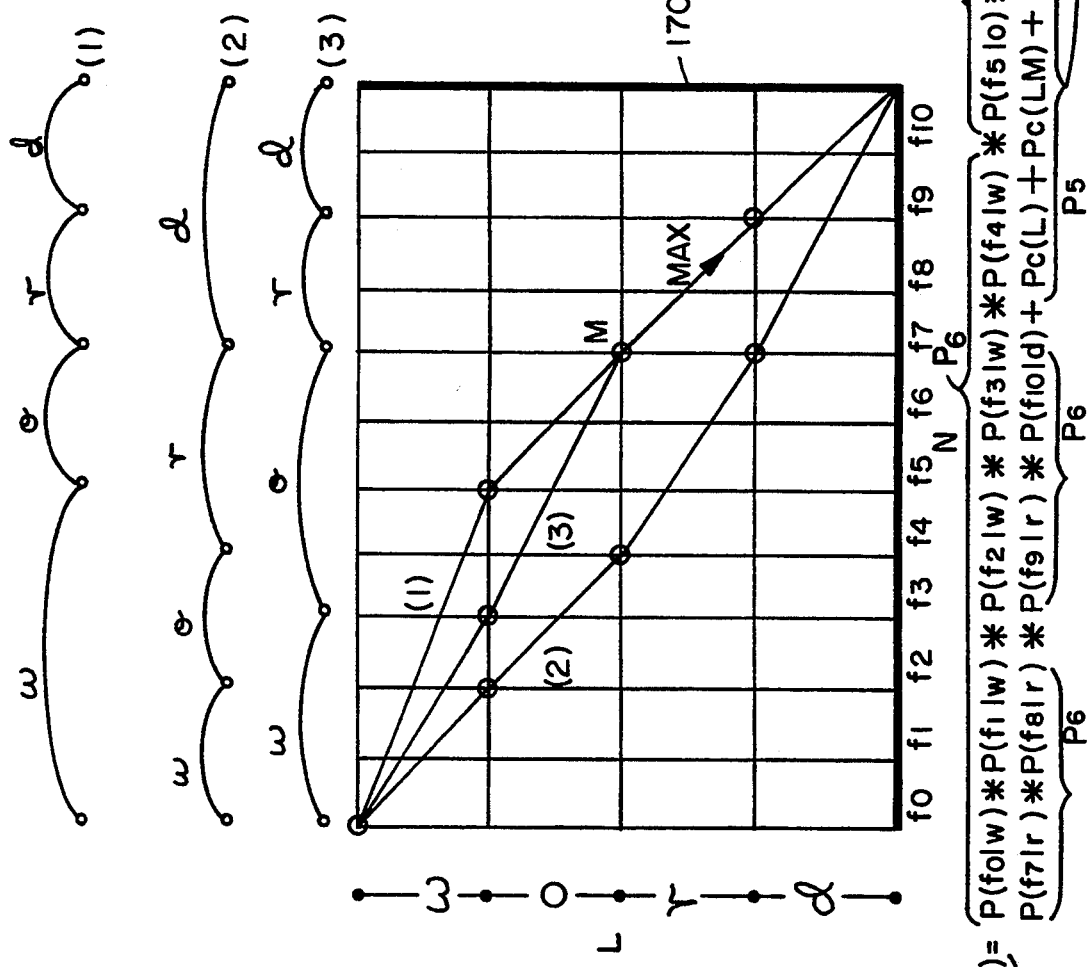
FIG. 24 illustrates the use of a search space, represented by a two-dimensional array grid structure, for processing successive frames in determining a letter-frame alignment and a probability comprised of letter-frame alignment probabilities and conditional probabilities.
Figure 25:
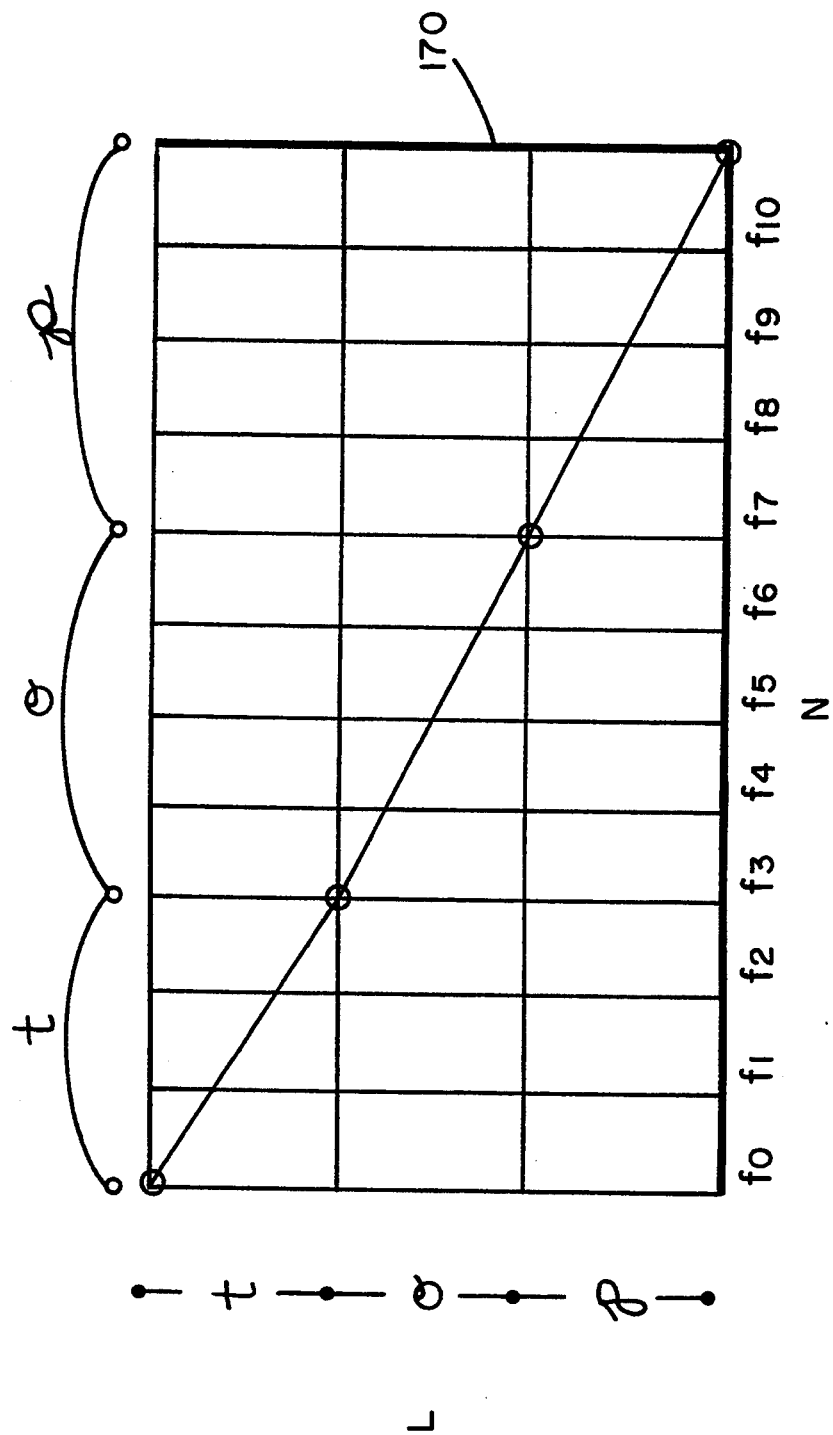
FIG. 25 illustrates one possible letter-frame alignment for the word "top"

Refer to FIGS. 24 and 25 for an example of a two dimensional array 170 described in Step 1 above. In the illustrated two dimensional array 170 of FIG. 24 N=11 and L=4 for the cursive, connected script representing "word". In FIG. 25, N=11 and L=3 for the word "top".

Three possible letter-frame alignments are shown at the top of FIG. 24. By example, in a first possible letter-frame alignment the letter "w" occupies five frames ($f_0$–$f_4$), and the letters "o", "r" and "d" each occupy two frames. The resultant paths are shown in the two dimensional array 170 as (1). The paths for the possible letter-frame alignments of examples (2) and (3) are designated correspondingly. At the bottom of FIG. 25 is shown a resulting Probability (P($f_0$...$f_{10}$|word$_{(1)}$)) for the first letter frame alignment. The corresponding probabilities $P_4$, $P_5$ and $P_6$ that were discussed above are also shown. The probability $P_4$ is determined from 11 letter-frame alignment probabilities, which are multiplied together, and at least one conditional probability ($P_5$), which is summed with the result of the multiplied letter-frame alignment probabilities. The conditional probabilities include, in accordance with this invention, the Length distribution conditional probability ($P_cL$), a Language Model conditional probability ($P_cLM$), and a Residual Length conditional probability ($P_cRL$).

As was described above, $P_cL$ is based on an assumption that each letter consumes some standard number of frames, and has a value that is a function of the frame width. In general, $P_cL$ is based on a grouping of the N frames into L groups, where L is a number of letters in a word being processed. $P_cLM$ is based on a frequency of occurrence of words within a language model, and $P_cRL$ is based upon a residual length (in frames) of a word being processed. $P_cLM$ and $P_cRL$ are described in greater detail below with respect to FIGS. 29, 30 and 31.

Model of Parallel Dynamic Programming

The procedure described above in steps 1–7 requires a linearly-proportional time to the size of the vocabulary, because the procedure is repeated for each word $w^i$ of the vocabulary. However, for those applications that require the use of a large vocabulary the required amount of processing time may be undesirable. In order to accommodate a large vocabulary, the following extension embeds the dynamic programming procedure into a suitable search procedure. Two preparations are needed for this extension.

Trie dictionary

To operate the parallel dynamic programming model, the words in the vocabulary are organized in a linked list or tree-style data structure. A tree data structure, when used to represent a vocabulary, may be referred to as a "trie" (FIG. 10). The trie has a root node, a plurality of intermediate nodes, and a plurality of leaf nodes. The trie of FIG. 10 illustrates a portion of the dictionary or vocabulary, specifically the words "to", "top", "wood", "word", "worm", "wax", "an", "and", "ant", and "ante". The dashed extensions indicate further branching of the trie. By example, the right-most branch may be extended for the words "antecedent" and "antebellum". Each node of the trie, referred to as a d-node hereinafter, points to other d-nodes corresponding to letters ($nl_i$) that may occur next.

Thus, for each d-node,
1. a conditional probability $$\left(\sum_i nl_i = 1\right),$$

and
2. a pointer to the next d-node(s)

are associated therewith. The root d-node contains all possible first letters in the vocabulary. Each d-node also includes a bit that indicates whether the letter string to the d-node from the root can complete a word. With the guidance of this trie structure, computation of P2($w^i$|F) for all words {$w^i$} is performed simultaneously, as opposed to sequentially.

Figure 26:
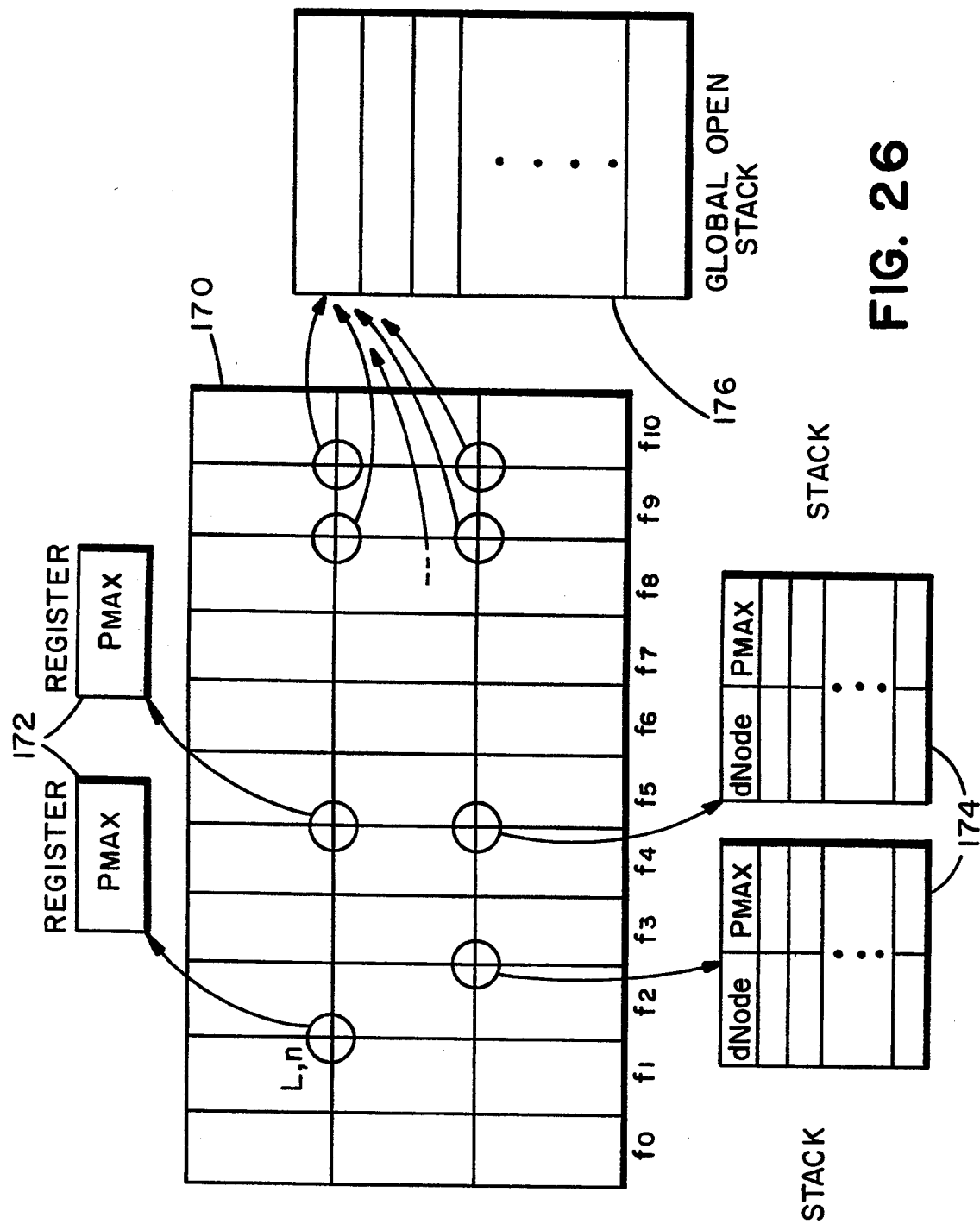
FIG. 26 illustrates the use of one register per grid structure location, one stack per grid structure location; and a global stack for representing all grid structure locations.

As is seen in FIG. 26, each array G grid location at [l,n] includes a register 172 to store the probability of the best alignment of the first n frames to the first l letters of the word $w^i$, and a pointer back to a d-node of the trie. This substring of letters is referred to as "word handle" hereinafter. After completing the dynamic programming process for one word, the same register 172 is used for the next word $w^{i+l}$ in the next iteration. If two paths merge, as at the grid location designated M in FIG. 24, a comparison is made between the probability that is currently being determined and the probability that is stored in the register 172 at the M grid location. If the probability that is currently being determined exceeds the probability that is stored in the register 172, then the value of the probability that is currently being determined replaces the probability stored in the register 172.

However, in the parallel dynamic programming model of this invention, the best alignment probability for all words {$w^1, w^2, \ldots w^v$} is computed simultaneously. This is accomplished by preparing a stack 174 (FIG. 26), instead of a register 172, for each grid position at [l,n]. An entry in the stack 174 at the grid position [l,n] includes at least two fields. One field stores the best probability, as in the register-based dynamic programming model described above. The second field stores a pointer to the d-node in the trie dictionary. The d-node that is pointed to corresponds to one particular sequence of letters from the beginning of the word (word-handle). In that the best alignment probability for all words ($w^1, w^2, \ldots w^v$) are computed simultaneously, the use of the d-node pointer field avoids confusion among the different word handles being computed simultaneously. Storing multiple best probabilities for different word handles at stack [l,n] enables many words to be tested in parallel. The size of the stack at a grid position [l,n] is bounded by the number of the d-node in the l-th level of the vocabulary trie.

Figure 27:
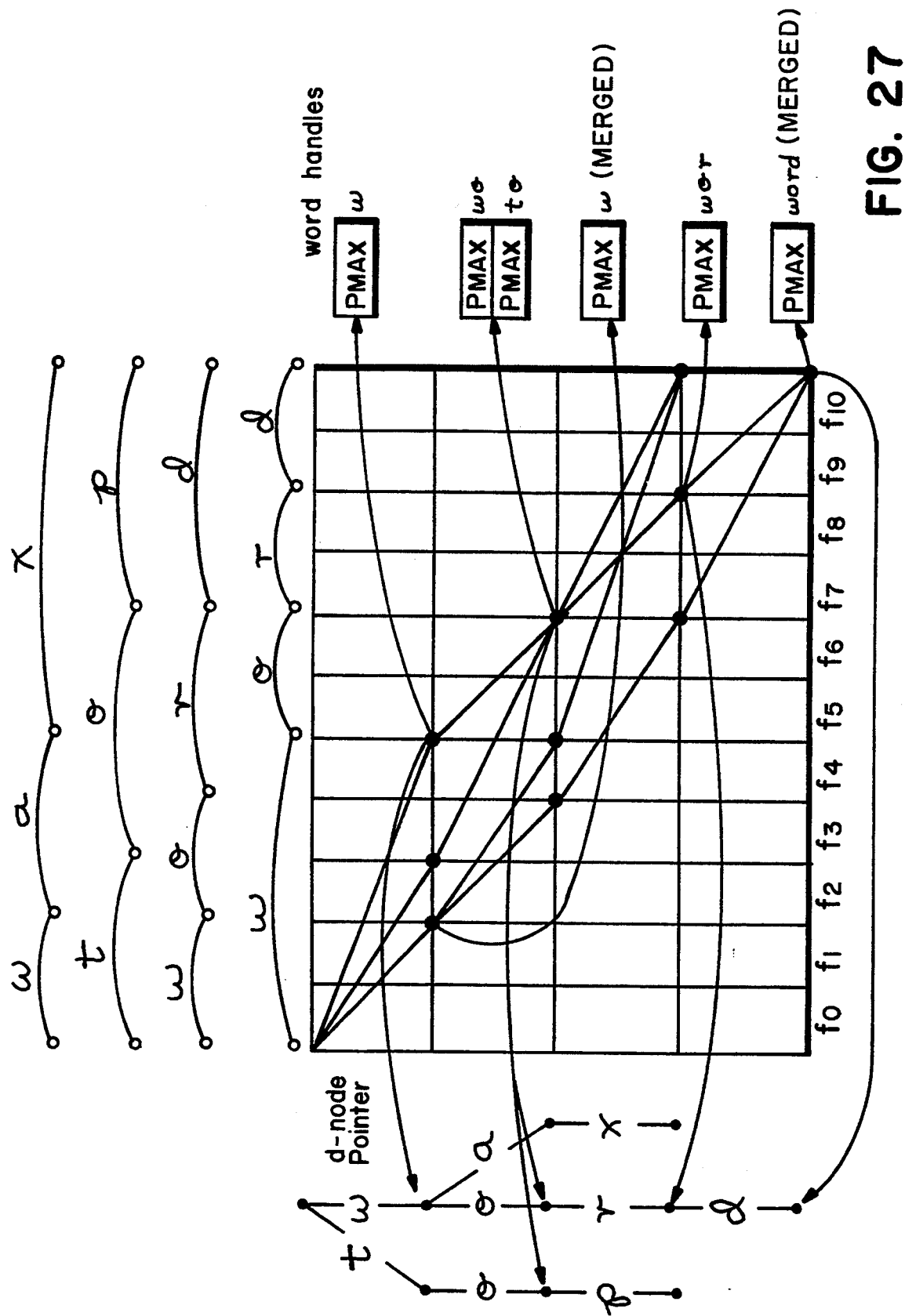
FIG. 27 illustrates the use of the one stack per grid structure location embodiment that is illustrated in FIG. 26, wherein each stack entry stores a probability and a pointer to a node of the trie data structure of FIG. 10.

FIG. 27 illustrates this stack-based dynamic programming model, wherein it can be seen that the grid locations each contain a stack 174 that includes one or more entries. Not all stacks 174 that are associated with the grid locations are shown in FIG. 27. Each stack 174 entry stores a pointer to a d-node of the trie, and also stores a current maximum probability value ($P_{MAX}$), for the associated word handle being processed. The stacks 174 are managed by order of $P_{MAX}$ value, that is, the entry at the top of a stack 174 is an entry having a largest $P_{MAX}$ value. This arrangement facilitates pruning of the stacks 174 during a word identification operation. By example, entries within a stack 174 are periodically examined and those having a $P_{MAX}$ value below a predetermined threshold are removed. In regard to the merged stacks 174 for the word handles "w" and "word" before a new entry is inserted into one of the stacks 174 a determination is made if another entry within the stack contains an identical d-node pointer. If yes, a further determination is made if the current value of the determined probability is greater than the value of $P_{MAX}$ for the identified entry. If yes, then the current probability value replaces the $P_{MAX}$ value in the identified entry, thus merging the two paths and reducing by one the total number of stack entries.

Implementation with Beam Search Technique

To perform the above mentioned parallel matching procedure in an efficient manner, a suitable search technique is required. A beam search technique is a presently preferred search method. A presently preferred beam search technique is described by N. J. Nilsson in "Problem Solving Methods in Artificial Intelligence", pages 54–59, McGraw Hill, 1971, where the beam search technique is referred to as "algorithm A*" (page 59).

To perform the A* search, all field pairs in the 1×n stacks 174 are merged into a single global stack 176 (FIG. 26). That is, each grid position is represented in the global open stack 176.

Stack Technique for Parallel Dynamic Programming Search

Figure 28:
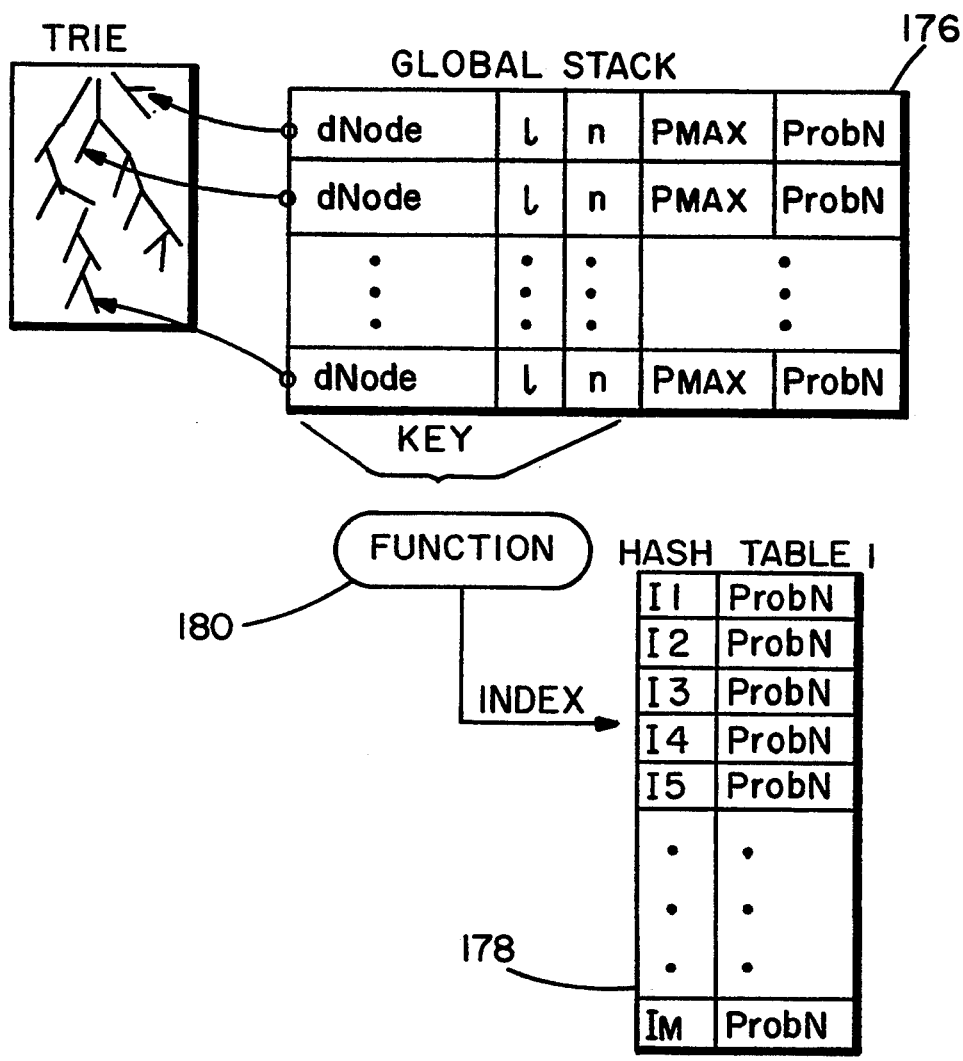
FIG. 28 illustrates the use of the global stack of FIG. 26 in combination with a hash table that is a feature of this invention.

The A* search uses the data structure of the stack 176 to represent its search space, the search space corresponding to the two dimensional array. Each entry or item within the stack 176 accommodates at least five fields, as described below and as is shown in FIG. 28. Two fields are identical to the one stack per grid location technique described above and shown in FIGS. 26 and 27, that is, a first field stores the best probability ($P_{MAX}$) and a second field stores a pointer to the d-node in the trie dictionary. The remainder of the fields are employed to satisfy the requirements of the A* search technique. The five global stack fields are described below.

Field 1. A pointer to a d-node in the vocabulary trie. Denoted by s→dNode.

Field 2. The probability $P_2$ up to this [l,n] grid point for the word being processed. Denoted s→Prob.

Field 3. Index l: grid location, denoted by s→l.

Field 4. Index n: grid location, denoted by s→n.

Field 5. A normalized probability $\hat{P}_2$ for ordering stack items in the stack 176. Denoted by s→ProbN.

Probability Normalization

During the A, search, all nodes from different (l,n) grid positions compete with one another in the single open stack 176. In this competition, the (l,n) grid position having the greatest ProbN value is found at the top of the global stack 176, with the other grid positions being represented in order of decreasing ProbN. In order not to favor the shorter paths, probabilities in the stack 176 are normalized on the length of the path. In that a log-scale probability is an addition of $P_o$, which linearly increases over the l index, and of $P_7$ and $P_1$, which linearly increase over the n index, these probabilities are preferably normalized by n and l, respectively.

The following code segment is exemplary of the operation of the stack 176 during the A* search.

```
while (forever)
{
  S = PopupFromStack    ;.   /* obtain top of stack 176 */
  if (S->n == EndOfFrame)
     if ( S->dNode->wFlags == END_OF_WORD)
        return;           /* end of search */
     else go to NEXTPOP;   /* This S is not good, go to
                             PopupFromStack */
  else;
  for (D = successor of S->dNode)   /* for each successor
                                       d-node */
  {
     for (j = s.n+L0 until s.n+L1)   /* for each number of
                                        frames that one
                                        letter can
                                        consume */
     {
        ProbN = <probability of the path from [s->l, s->n]
          to [s->l+1,s->n+j] with letter D>
        ProbN = normalize(fProbN);
        sInHash = hashKeyFrom(l+1, n+j, D);
        if (sInHash == NULL)        /* no corresponding
                                       hash table entry */
           hashWriteInto(l+1, n+j, D, ProbN);
        else if (sInHash->ProbN > ProbN)  /* hash table entry
                                              has greater
                                              normalized
                                              probability
                                              value */
              go to SKIP;
        else hashRewrite (l + 1, n + j, D, ProbN);
                                    /* current normalized
                                       probability value
                                       is greater and
                                       replaces value in
                                       hash table */
        create NewSNode and set five fields;
        PushIntoStack(NewSNode);
SKIP:
     } /* for each possible frame consumption range */
  } /* for each possible letter to come next */
NEXTPOP:
} /* while the open stack is not empty */
} /* SearchAStar() */
```

The hashing related functions: hashKeyFrom(), hashWriteInto() and hashRewrite() are important elements of the parallel dynamic programming method of this invention. By the use of hashing, the maximum normalized probability ProbN is maintained for the combination of a word handle wh and the grid location at [l,n].

The inventors have determined that the use of the hashing function with the beam search technique is made possible because each word $w_i$ has a number of possible letter-frame alignment possibilities. By example, if there are 20,000 words within the vocabulary, and an average of 1,000 possible letter-frame alignments per word, then the search space would require 200×105 possible combinations. However, in that each word (hash key) differs only in alignment, the alignments may be dropped, resulting in a significant reduction in the size of the search space.

Referring to FIG. 28, it is shown that the use of hashing during the beam search significantly increases execution speed. In a preferred embodiment, a hash table 178 is established. The hash table 178 has a plurality of entries, each identified by an index ($I_1$–$I_M$). Each hash table entry has a corresponding entry within the global stack 176. The index value for a given hash table 178 entry is determined by a hashing function 180 that is applied to a key composed of a combination of dNode, l, and n. Each hash table 178 entry stores the corresponding ProbN value from the stack 176 entry, and provides the beam search technique rapid access to a ProbN value for comparison purposes.

As shown within the inner loop of the code segment set forth above, during the expansion of a stack 176 entry by the A* search the normalized probability (ProbN) is determined. Instead of performing a time-consuming linear search of the stack 176 to determine if another entry has the same d-node field entry, the current values for dNode, l, and n are applied as the key to the hashing function 180 to determine an index value (hashKeyFrom()). The index value is then applied to the hash table 178 to determine if a corresponding entry exists. If no corresponding hash table entry exists (NULL), then a hash table 178 entry is created for the determined index value, and the current value of ProbN is stored in the hash table 178 (hashWriteInto()). A new stack 176 entry is also created and the fields 1–5 set accordingly (create NewSNode and PushIntoStack()).

If, instead, the application of the index value to the hash table 178 determines that a corresponding entry does exist, the stored value of ProbN in the hash table 178 entry is compared to the current, just determined value for ProbN. If the ProbN value in the hash table 178 is greater than the current ProbN value, then no new stack 176 entry is created and the hash table 178 is not updated (SKIP). Else, if the current value of ProbN is greater than the ProbN value stored within the corresponding entry of the hash table 178, the current value for ProbN replaces that within the hash table 178 (hashRewrite()).

The selection of suitable hashing functions, such as the hashing function 180, is well known. In general, the function is selected so as to avoid the generation of duplicate index values, referred to as a collision, over the range of possible key values.

Figure 29:
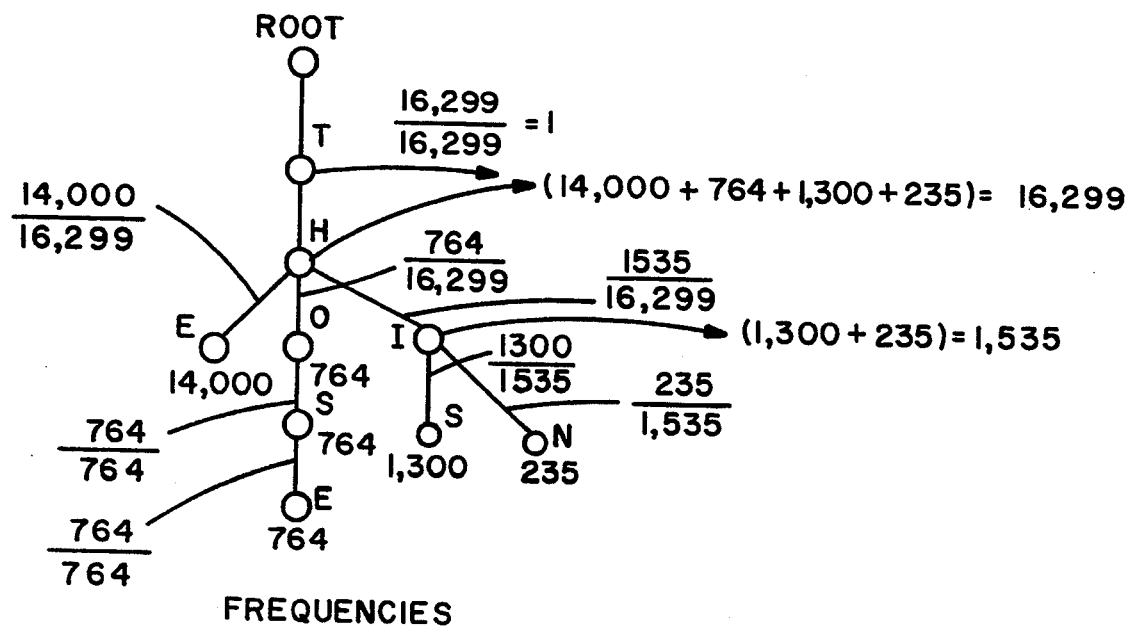
FIG. 29 illustrates a portion of the trie data structure of FIG. 10 in the derivation of a Language Model conditional probability that is a feature of this invention.

The above-mentioned Language Model conditional probability term $P_c(LM)$ is described in further detail with respect to the simplified trie shown in FIG. 29. After the vocabulary trie is constructed, the word corresponding to each leaf is examined, and a relative frequency of occurrence of the word in the language model is determined. The language model may be a general language model or, depending upon the application for the handwriting recognizer, may be a specialized language model tailored to a specific discipline, such as engineering or medicine.

For example, in FIG. 29 the word "thin" is determined to have a relative frequency of occurrence of 235 in the language model, the word "this" a frequency of 1300, the word "those" a frequency of 764, and the word "the" a frequency of 14000. Next, the trie is traversed from the leaves back towards the root, summing the frequencies at each d-node. For example, for the d-node corresponding to the word handle "thi" the frequency is the summation of frequencies for the words "thin" and "this" or 1535 and the probabilities for each of the two paths from this d-node are 1,300/1535 (most probable) and 235/1,535 (least probable). These probabilities are stored in association with the d-node corresponding to the word handle "thi". The d-node corresponding to the word handle "th" stores the probabilities 14,000/16,299 for the path to "e"(most probable), and 764/16,299 and 1,535/16,299 corresponding to the paths to the next letters "o" and "i", respectively During the operation of the search method during word recognition, when a d-node is accessed the stored probability value is employed as the value of $P_cLM$, which in turn influences the value of ProbN for that grid position. As a result, word handles having a greater frequency of occurrence are favored, and will tend to be found nearer the top of the stack 174 or 176.

Figure 30:
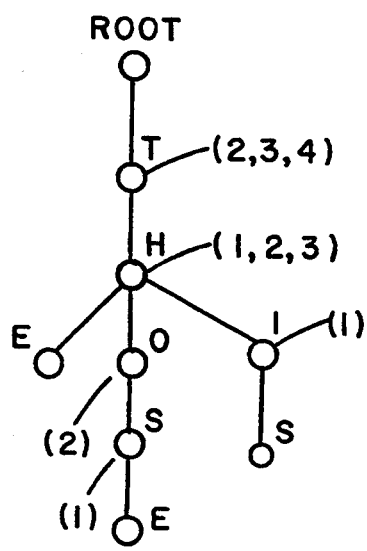
FIG. 30 illustrates a portion of the trie data structure of FIG. 10 in the derivation of a Residual Length conditional probability that is a feature of this invention.

The abovementioned Residual Length conditional probability term $P_cRL$ is described in further detail with respect to the simplified trie shown in FIG. 30. After the vocabulary trie is constructed, the d-nodes are examined to determine how many letters remain to the end of the associated word(s). For example, for the d-node corresponding to the word handle "thos" only one letter remains, while for the preceding d-node, corresponding to the word handle "tho" two letters remain For the d-node corresponding to the word handle "th" the number of possible remaining letters is either 1 ("e"), 2 ("is"), or 3 ("ose").

During the operation of the search method during word recognition, and at a given grid position, it is known how many frames remain (frame#$_{max}$-frame#$_{current}$). It is also known, a priori, what the average frame consumption is for all of the letters of the alphabet. When a d-node is accessed the number(s) of remaining letters is obtained. Based on the number of remaining letters, and on the number of remaining frames, the value of $P_cRL$ is determined, which in turn influences the value of ProbN for that grid position.

Figure 31:
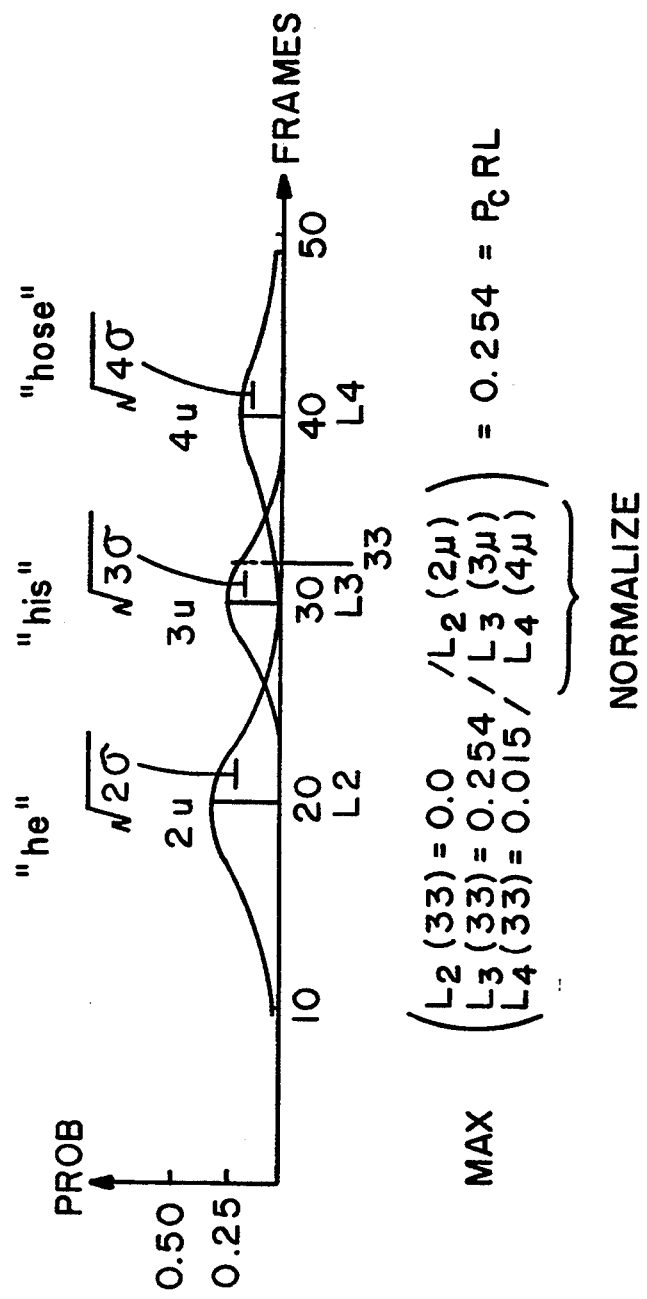
FIG. 31 illustrates a method for determining the Residual Length conditional probability.

By example, and referring to FIG. 31, if at a grid location corresponding to the d-node "t" of FIG. 30 it is known that 33 frames remain, and if the average frame consumption for all of the letters of the alphabet has been predetermined to be 10, then frame consumption distributions for each of the remaining numbers of letters are determined. The distributions are at a maximum at 2, 3, and 4, corresponding to 2×10 frames for "he", 3×10 frames for "his" and 4×10 frames for "hose" For the remaining number of frames (33), the probabilities are determined for each of the paths from the d-node corresponding to "t", and each of these probabilities is normalized as shown. The maximum (MAX) normalized probability value corresponding to (0.254) is then selected, this probability value being associated with the path for "his". As a result, word handles having a greater conditional residual length probability are favored, and will tend to be found nearer the top of the stack 174 or 176.

Delayed strokes are strokes made afterwards to conclude letters In actual handwriting, cross-bars in "t" dots in "i" and "j" and strokes from right to left in "x" are given after writing other letters to the right. These delayed strokes may cause difficulties in on-line handwriting recognition where signals are captured in time-sequence.

Figure 32A:
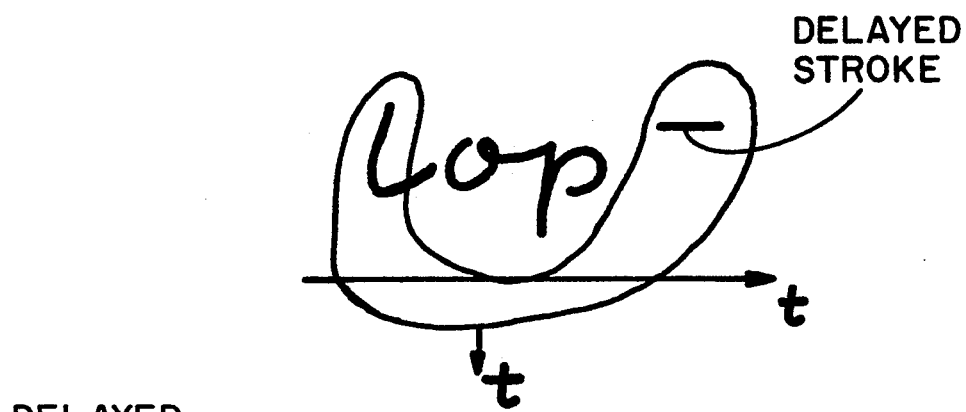
FIGS. 32a and 32b illustrate the processing of delayed strokes.
Figure 32B:
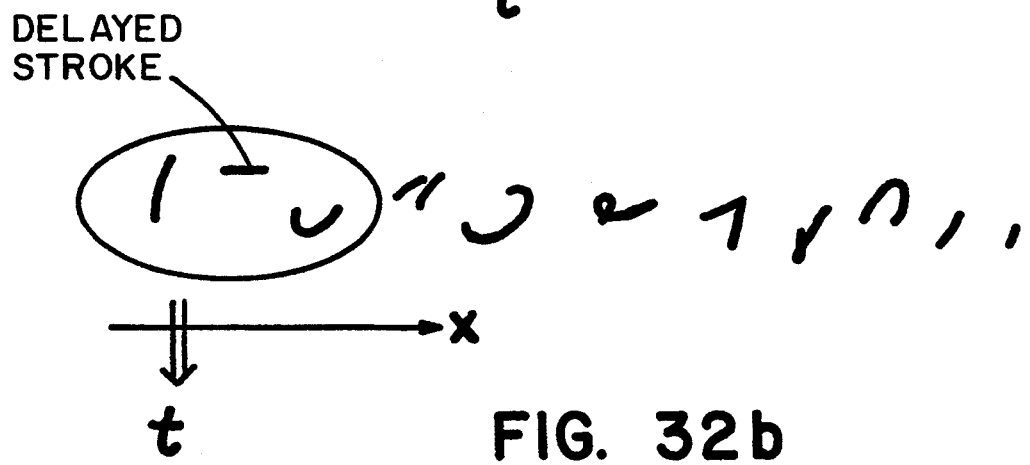

As illustrated in FIGS. 32a and 32b, in the method of this invention the input signals from the tablet 14 need not be ordered in time-sequence. To accommodate delayed strokes, the input frames are ordered by the mid-x axis coordinate of the frame (FIG. 32b), rather than by time (FIG. 32a). This allows, for example, a "t" written with a delayed stroke to match against a "t" reference which does not have a delayed stroke. The use of the previously described conditional probabilities supports this flexible handling of delayed strokes.

The method described in detail above has been implemented on a RS/6000 workstation and tested against 161 connected handwriting words from a writer. A 2171 word dictionary was used as the vocabulary constraint. To derive probabilities, 1600 characters were written by the same subject on the same tablet discretely. Prototypes were generated by the procedure described in detail above.

Recognition speed and word accuracy were measured with three methods for comparison. The three compared methods were:
1. word recognition by DP only (pure DP);
2. word recognition by A, only, but not with DP (pure A*); and
3. word recognition by A*, with DP and hashing (parallel DP).

The Table below shows the recognition results for a word (average) by each of the three different methods.

|              | pure DP      | pure A*      | parallel DP  |
| ------------ | ------------ | ------------ | ------------ |
| accuracy (%) | 93.2         | 89.7         | 89.7         |
| speed        | 6.27 sec/word| 3.1 sec/word | 0.7 sec/word |

It should be realized that a number of modifications to the foregoing teaching may be made. By example, parallel search techniques other than the A* may be employed. Further in this regard, when employing another search technique it may prove to be advantageous to provide, instead of the single, global stack 176, a plurality of stacks, one for each of the rows of the two-dimensional grid 170. The use of conditional probabilities other than, or in addition to, the conditional probabilities described above may also be desirable. Modifications to the various methods and flowcharts may also be accomplished, such as by switching the execution order of certain of the steps. Furthermore, the teaching of the invention can employ other methods to frame the input handwritting signals, such as by a temporally based elastic matching technique. That is, the teaching of the invention does not require that the input handwriting signals be transformed into a higher dimensional feature space (chirographic space), and be presented as overlapping frames.

Thus, while the invention has been particularly shown and described with respect to presently preferred embodiments thereof, it will be understood by those skilled in the art that changes in form and details may be made therein without departing from the scope and spirit of the invention.

Having thus described our invention, what we claim as new, and desire to secure by Letters Patent is:

1. Handwriting recognition apparatus, comprising:
   handwriting transducer means having an output providing temporally-ordered stroke coordinate information generated by a writer while writing, in a cursive manner, a word that includes at least one letter;
   a pre-processor, comprising,
   a splicer having an input coupled to said output of said handwriting transducer means for partitioning the temporally ordered stroke coordinate information into a plurality of frames, each frame containing at least a portion of a stroke; and
   a frame shape recognizer coupled to an output of said splicer for assigning to each frame a probability that the portion of a stroke that is contained within a frame $f_j$ is a part of a letter belonging to an alphabet $a_i$;
   said handwriting apparatus further comprising a word recognizer having an input coupled to an output of said pre-processor and an output for outputting a most probable word that was written by the writer, said word recognizer comprising,
   a vocabulary model stored within said handwriting recognition apparatus and containing a plurality of words, each of the words including at least one character, said vocabulary model being organized as a data structure having a root node, a plurality of intermediate nodes each representing a letter of the alphabet $a_i$ belonging to at least one word, and a plurality of leaf nodes each representing a terminal letter of a word; and
   a decoder processor having a first input coupled to an output of said pre-processor and a second input coupled to an output of said vocabulary model, said decoder processor including means for processing, in turn, each of said frames in cooperation with said vocabulary model to determine a most probable letter-frame alignment and for identifying a most probable word written by the writer to be output from said word recognizer.

2. Apparatus as set forth in claim 1 wherein said splicer operates to partition the stroke coordinate information into a plurality of overlapping frames of equal length.

3. Apparatus as set forth in claim 1 wherein said processing means includes means, responsive to information stored within said vocabulary model, for employing at least one conditional probability to identify a most probable word written by the writer.

4. Apparatus as set forth in claim 3 wherein said at least one conditional probability is a function of a frequency of occurrence of words and portions of words within a selected language model.

5. Apparatus as set forth in claim 3 wherein said at least one conditional probability is a function of a number of frames that remain to be processed.

6. Apparatus as set forth in claim 3 wherein said at least one conditional probability is a function of a distribution of a number of frames for each possible letter.

7. Apparatus as set forth in claim 1 wherein said processing means includes means for establishing a search space within said memory, said search space being represented by a two dimensional array having N columns and L rows, wherein N=a number of frames, and where L=a number of letters in a word found within said vocabulary model.

8. Apparatus as set forth in claim 7 wherein said processing means further includes means for managing, within said memory, a plurality (N×L) of stacks each having at least one entry, said at least one entry including information for specifying a node of said vocabulary model and a probability that a letter string associated with the node represents at least a part of the word written by the writer.

9. Apparatus as set forth in claim 7 wherein said processing means includes means for managing, within said memory, a stack having a plurality of entries, each of said entries including information for specifying a node of said vocabulary model, information for identifying a row and a column location within said two dimensional array, and a normalized probability that a letter string associated with the node represents at least a part of the word written by the writer.

10. Apparatus as set forth in claim 9 wherein said memory further includes a hash table having a plurality of entries, each of said hash table entries including information for representing the normalized probability stored within an entry of said stack, and where said processing means further includes means for generating an index into said hash table in accordance with information that specifies a node of said vocabulary model and information that identifies a row and a column location within said two dimensional array.

11. A method for operating a handwriting recognition apparatus, comprising the steps of:
   outputting temporally ordered stroke coordinate information generated by a writer while writing, in a cursive manner, a word that includes at least one character;
   operating a handwriting recognition pre-processor in response to outputted stroke coordinate information by the steps of,
   operating a splicer to perform a step of partitioning the outputted temporally ordered stroke coordinate information into a plurality of frames, each frame containing at least a portion of a stroke; and
   operating a frame shape recognizer to perform a step of assigning to each frame a probability that the portion of a stroke that is contained within a frame $f_j$ is a part of a letter belonging to an alphabet $a_i$;
   the method further comprising a step of operating a word recognizer for outputting a most probable word that was written by the writer by the steps of,
   performing an initial step of storing a vocabulary model as a data structure within a memory of the handwriting recognition apparatus, the data structure being organized to have a root node, a plurality of intermediate nodes each representing a letter of the alphabet $a_i$ belonging to at least one word, and a plurality of leaf nodes each representing a terminal letter of a word; and
   operating a decoder processor to process, in turn, each of the frames in cooperation with information retrieved from the vocabulary model to determine a most probable letter-frame alignment for identifying a most probable word written by the writer for output from the word recognizer.

12. A method as set forth in claim 11 wherein the step of operating the decoder processor to process the frames includes a step of determining at least one conditional probability from a node of the vocabulary model, the at least one conditional probability being a function of a frequency of occurrence of words and portions of words within a selected language model represented within the vocabulary model.

13. A method as set forth in claim 11 wherein the step of operating the decoder processor to process the frames includes a step of determining at least one conditional probability from a node of the vocabulary model, the at least one conditional probability being a function of a number of frames that remain to be processed.

14. A method as set forth in claim 11 wherein the step of operating the decoder processor to process the frames includes a step of determining at least one conditional probability from a node of the vocabulary model, the at least one conditional probability being a function of a distribution of a number of frames for each possible letter.

15. A method as set forth in claim 11 wherein the step of operating the decoder processor to process the frames includes a step of establishing a two dimensional array having N columns and L rows, wherein N=a number of frames, and wherein L=a number of letters in a word found within the vocabulary model.

16. A method as set forth in claim 15 wherein the step of operating the decoder processor to process the frames further includes a step of managing a plurality (N×L) of stacks each having at least one entry, said at least one entry including information for specifying a node of the vocabulary model and a probability that a letter string associated with the node represents at least a part of the word written by the writer.

17. A method as set forth in claim 15 wherein the step of operating the decoder processor to process the frames further includes a step of managing a stack having a plurality of entries, each of the entries including information for specifying a node of the vocabulary model, information for identifying a row and a column location within the two dimensional array, and a normalized probability that a letter string associated with the node represents at least a part of the word written by the writer.

18. A method as set forth in claim 17 wherein the step of operating the decoder processor to process the frames further includes the steps of:
   storing a hash table having a plurality of entries, each of the hash table entries including information for specifying the normalized probability stored within an entry of the stack; and
   generating an index into the hash table in accordance with information that specifies a node of the vocabulary model and in accordance with information that identifies a row and a column location within the two dimensional array.

19. A method for recognizing handwriting that includes cursively written words, comprising the steps of:
   storing a vocabulary model organized as a trie data structure having a root node, a plurality of intermediate nodes each representing a letter of an alphabet $a_i$ belonging to at least one word, and a plurality of leaf nodes each representing a terminal letter of a word;
   outputting to a data processor, from a handwriting transducer, temporally ordered stroke coordinate information generated by a writer while cursively writing a word that includes at least one letter;
   partitioning, with the data processor, the outputted temporally ordered stroke coordinate information into a plurality of frames, each frame containing at least a portion of a stroke;
   operating the data processor to determine a probability that the portion of a stroke that is contained within a frame $f_j$ is a part of a letter belonging to the alphabet $a_i$; and
   operating the data processor to access the stored vocabulary model to process, in parallel, a plurality of the nodes of the vocabulary model with, in turn, each of the frames to identify a most probable word written by the writer.

20. A method for recognizing handwriting that includes cursively written words, comprising the steps of:

storing a vocabulary model organized as a trie data structure having a root node, a plurality of intermediate nodes each representing a letter of an alphabet $a_i$ belonging to at least one word, and a plurality of leaf nodes each representing a terminal letter of a word;

outputting to a data processor, from a handwriting transducer, temporally ordered stroke coordinate information generated by a writer while cursively writing a word that includes at least one letter;

partitioning, with the data processor, the outputted temporally ordered stroke coordinate information into a plurality of frames, each frame containing at least a portion of a stroke;

operating the data processor to determine a probability that the portion of a stroke that is contained within a frame $f_j$ is a part of a letter belonging to the alphabet $a_i$; and operating the data processor to access the stored vocabulary model to process, with a beam search technique, the nodes of the vocabulary model with, in turn, each of the frames to identify a most probable word written by the writer.

21. A method as set forth in claim 20 wherein the step of operating the data processor to process the nodes of the vocabulary model with the beam search technique includes a step of determining at least one conditional probability from a node of the vocabulary model, the at least one conditional probability being a function of a distribution of a number of frames for each possible letter of the alphabet $a_i$.

22. A method as set forth in claim 20 wherein the step of operating the data processor to process the nodes of the vocabulary model with the beam search technique includes a step of determining at least one conditional probability from a node of the vocabulary model, the at least one conditional probability being a function of a frequency of occurrence of words and portions of words within a selected language model that is represented by the vocabulary model.

23. A method as set forth in claim 20 wherein the step of operating the data processor to process the nodes of the vocabulary model with the beam search technique includes a step of determining at least one conditional probability from a node of the vocabulary model, the at least one conditional probability being a function of a number of frames that remain to be processed.

24. A method as set forth in claim 20 wherein the step of operating the data processor to process the nodes of the vocabulary model with the beam search technique includes the steps of:

establishing a search space as a two dimensional array having N columns and L rows, wherein N=a number of frames, and wherein L=a number of letters in a word of the vocabulary model; and managing a global stack having a plurality of entries, each of the entries including information for specifying a node of the vocabulary model, information for identifying a row and a column location within the two dimensional array, and a normalized probability that a letter string associated with the node represents at least a part of the word written by the writer.

25. A method as set forth in claim 24 wherein the step of operating the data processor to process the nodes of the vocabulary model with the beam search technique further includes the steps of:

storing within a memory a hash table having a plurality of entries, each of the hash table entries including information for specifying the normalized probability stored within an entry of the global stack; and generating an index into the hash table in accordance with information that specifies a node of the vocabulary model and in accordance with information that identifies a row and a column location within the two dimensional array.

26. A method for recognizing handwritten words in response to an input signal from a handwriting transducer, comprising the steps of:

performing an initial step of preparing models for each letter that may be included within a word belonging to a vocabulary of words;

storing the prepared letter models;

operating a data processor to perform the steps of, partitioning the input signal into a plurality of frames, each frame including at least one portion of a handwritten stroke;

determining for each frame a likelihood that the portion of the stroke contained therein is a portion of a letter belonging to a predetermined letter set;

based on the prepared letter models, (1) choosing one word from a vocabulary at a time;

(2) for a word chosen from the vocabulary, and in accordance with the likelihoods determined for each frame, finding a most-likely letter and frame alignment and a likelihood score that indicates a probability that the input signal was generated in response to a writing that corresponds to the chosen word;

(3) repeating steps 1 and 2 for all words in the vocabulary; and for a letter and frame alignment that gives the best likelihood score, identifying the corresponding word from the vocabulary as being a most-likely word that corresponds to the input signal.

27. A method for recognizing handwritten words in response to an input signal from a handwriting transducer, comprising the steps of:

performing an initial step of preparing models for each letter that may be included within a word belonging to a vocabulary of words;

storing the prepared letter models;

operating a data processor to perform the steps of, partitioning the input signal into a plurality of frames, each frame including at least one portion of a handwritten stroke;

determining for each frame a likelihood that the portion of the stroke contained therein is a portion of a letter belonging to a predetermined letter set;

based on the prepared letter models, processing in parallel all words from a vocabulary to determine, for each word in the vocabulary, and in accordance with the likelihoods determined for each frame, a most-likely letter and frame alignment and a likelihood score that indicates a probability that the input signal was generated in response to a writing that corresponds to the word in the vocabulary; and for a letter and frame alignment that gives the best likelihood score, identifying the associated word from the vocabulary as being a most-likely word that corresponds to the input signal.

28. A method for recognizing handwritten words in response to an input signal from a handwriting transducer, comprising the steps of:

partitioning the input signal into N frames;

operating a data processor to determine for each of the N frames a probability that the portion of the input signal contained therein is a portion of a letter belonging to a predetermined letter set; accessing a vocabulary model with the data processor to retrieve a word therefrom;

processing the retrieved word to determine a probability that the word represents a written word that is conveyed by the input signal, the determined probability being a function of N letter-frame alignment probabilities and also being a function of a probability based on a grouping of the N frames into L groups, where L is a number of letters in the word being processed; and identifying a word having a highest determined probability as being a most-likely word that is conveyed by the input signal.

29. A method as set forth in claim 28 wherein the step of processing processes all of the words from the vocabulary model in parallel.

30. A method as set forth in claim 28 wherein the determined probability is also a function of a probability based on a frequency of occurrence of words, and portions of words, within a selected language model.

31. A method as set forth in claim 28 wherein, for each word, the N letter-frame alignment probabilities are determined by processing each of the N frames in turn, and wherein the determined probability is also a function, when processing a frame other than the Nth frame, of a number of frames that remain to be processed.

32. A method as set forth in claim 28 wherein the input signal represents a plurality of strokes, and wherein each of the N frames is ordered by an x-axis coordinate that lies at a center of each frame.

33. Apparatus for recognizing handwritten words in response to an input signal from a handwriting transducer means, comprising:

a splicer for partitioning the input signal into N frames;

a frame shape recognizer coupled to an output of said splicer for assigning to each of said N frames a probability that the portion of a stroke that is contained within a frame $f_j$ is a part of a letter belonging to an alphabet $a_i$;

a vocabulary model that is coupled to a data processor for being accessed thereby;

said data processor including means for processing words read from said vocabulary model to determine, for each processed word, a probability that the word represents a written word that is conveyed by the input signal, the determined probability being a function of N letter-frame alignment probabilities and also a probability based on a grouping of the N frames into L groups, where L is a number of letters in the word; and means for identifying a word having a highest determined probability as being a most-likely word that is conveyed by the input signal.

34. A method for recognizing handwritten words in response to an input signal from a handwriting transducer, comprising the steps of:

receiving an input signal from a handwriting transducer, the input signal including temporally ordered stroke coordinate information; and operating a data processor to perform the steps of, partitioning the input signal into N frames;

assigning to each of said N frames a probability that a portion of the input signal that is contained within a frame $f_j$ is a part of a letter belonging to an alphabet $a_i$;

accessing a vocabulary model that stores a plurality of words;

processing words read from the vocabulary model in accordance with a beam search technique to determine, for each processed word, a probability that the word represents a written word that is conveyed by the input signal; and identifying a word having a highest determined probability as being a most-likely word that is conveyed by the input signal; wherein the step of processing maintains a stack for storing a plurality of the determined probabilities; wherein the step of processing further maintains a hash table having entries, each of the entries storing an individual one of the plurality of determined probabilities; and wherein the step of processing includes a step of accessing an entry within the hash table to compare a currently determined probability against a determined probability that is stored within the entry of the hash table.

35. A method as set forth in claim 34 wherein each of the determined probabilities that are stored within the stack and within the hash table is first normalized in accordance with an associated path length through a search space.

36. A method as set forth in claim 34 wherein the step of accessing an entry within the hash table includes a step of forming a key that includes information specifying a current location within a search space and also information specifying a location within the vocabulary model.

* * * * *